(12) United States Patent
Moshal

(10) Patent No.: US 12,499,733 B2
(45) Date of Patent: Dec. 16, 2025

(54) APPARATUS AND METHOD FOR A NON-GAMBLING GAME

(71) Applicant: Fusion Holdings Limited, Douglas (IM)

(72) Inventor: Martin Paul Moshal, Sydney (AU)

(73) Assignee: Fusion Holdings Limited, Douglas (IM)

( * ) Notice: Subject to any disclaimer, the term of this patent is extended or adjusted under 35 U.S.C. 154(b) by 230 days.

(21) Appl. No.: 18/355,591

(22) Filed: Jul. 20, 2023

(65) Prior Publication Data

US 2025/0029445 A1    Jan. 23, 2025

(51) Int. Cl.
*G07F 17/32*    (2006.01)

(52) U.S. Cl.
CPC ...... *G07F 17/3255* (2013.01); *G07F 17/3213* (2013.01); *G07F 17/3227* (2013.01); *G07F 17/323* (2013.01); *G07F 17/3237* (2013.01)

(58) Field of Classification Search
CPC ............. G06F 17/3255; G06F 17/3213; G06F 17/3227; G06F 17/323; G06F 17/3237; G06F 17/3244; G06F 17/3265
USPC .......................................................... 463/25
See application file for complete search history.

(56) References Cited

U.S. PATENT DOCUMENTS

| | | | |
|---|---|---|---|
| 8,771,074 B2 | 7/2014 | Walker et al. | |
| 10,217,314 B2 | 2/2019 | Thomas et al. | |
| 10,580,256 B2 | 3/2020 | Escalante | |
| 10,713,895 B2 | 7/2020 | Pececnik et al. | |
| 10,953,328 B1 | 3/2021 | Schuster | |
| 2003/0224852 A1 | 12/2003 | Walker et al. | |
| 2004/0127284 A1 | 7/2004 | Walker et al. | |
| 2006/0148551 A1 | 7/2006 | Walker et al. | |
| 2006/0247030 A1 | 11/2006 | Walker et al. | |
| 2006/0287070 A1 | 12/2006 | Walker et al. | |
| 2007/0202941 A1 | 8/2007 | Miltenberger et al. | |

(Continued)

FOREIGN PATENT DOCUMENTS

| | | |
|---|---|---|
| WO | 2025/017505 A1 | 1/2025 |
| WO | 2025/078977 A1 | 4/2025 |

OTHER PUBLICATIONS

U.S. Appl. No. 19/217,736, filed May 23, 2025, Inventor: Martin Paul Moshal.

(Continued)

*Primary Examiner* — Pierre E Elisca
(74) *Attorney, Agent, or Firm* — McDonnell Boehnen Hulbert & Berghoff LLP

(57) ABSTRACT

A method and computing system for providing a non-gambling game are disclosed. A computing system receives individual registration data and determines whether the registration data corresponds to a base or premium tier. A premium tier can be provided if the player previously enrolled in a membership subscription with an entity associated with the provider of the game. Upon receiving a start input, and without any requirement of payment for a wager, the computing system operates the game. Upon detecting a trigger event, such as the end of a turn of the game where a pattern of symbols has become certain, the computing system makes a payout determination. The mode of game operation differs in response to base and premium tier registration data.

21 Claims, 17 Drawing Sheets

(56) References Cited

U.S. PATENT DOCUMENTS

| | | | |
|---|---|---|---|
| 2007/0259709 A1* | 11/2007 | Kelly | G07F 17/3211 463/20 |
| 2007/0265094 A1 | 11/2007 | Tone et al. | |
| 2008/0153567 A1 | 6/2008 | Juds et al. | |
| 2009/0131175 A1* | 5/2009 | Kelly | G07F 17/3262 463/42 |
| 2009/0172035 A1 | 7/2009 | Lessing et al. | |
| 2009/0270174 A1 | 10/2009 | Kelly et al. | |
| 2010/0151926 A1 | 6/2010 | Ruppert et al. | |
| 2011/0151965 A1 | 6/2011 | Tarantino | |
| 2011/0183745 A1 | 7/2011 | Gagner et al. | |
| 2011/0269535 A1* | 11/2011 | Kelly | G07F 17/3244 463/25 |
| 2011/0270425 A1* | 11/2011 | Kelly | G07F 17/3239 700/92 |
| 2012/0004747 A1* | 1/2012 | Kelly | G07F 17/3239 700/91 |
| 2012/0058818 A1* | 3/2012 | Kelly | G07F 17/3239 463/25 |
| 2012/0157187 A1* | 6/2012 | Moshal | G07F 17/32 463/25 |
| 2012/0190441 A1 | 7/2012 | Crowder, Jr. | |
| 2013/0029761 A1 | 1/2013 | Walker et al. | |
| 2013/0079120 A1 | 3/2013 | Walker et al. | |
| 2013/0079134 A1 | 3/2013 | Walker et al. | |
| 2013/0079153 A1 | 3/2013 | Crowder, Jr. et al. | |
| 2013/0225272 A1* | 8/2013 | Moshal | G07F 17/3255 463/25 |
| 2014/0128135 A1 | 5/2014 | Balise, III | |
| 2014/0179390 A1* | 6/2014 | Kelly | G07F 17/3244 463/19 |
| 2015/0199868 A1* | 7/2015 | Kelly | G07F 17/3225 463/25 |
| 2016/0117882 A1 | 4/2016 | Walker et al. | |
| 2016/0125521 A1 | 5/2016 | Randel | |
| 2016/0240040 A1 | 8/2016 | Gnanasundram et al. | |
| 2017/0301178 A1 | 10/2017 | Thomas et al. | |
| 2019/0005769 A1 | 1/2019 | Escalante | |
| 2020/0250930 A1 | 8/2020 | Escalante | |
| 2020/0286338 A1 | 9/2020 | Liss | |
| 2022/0036692 A1* | 2/2022 | Gupta | G07F 17/3223 |
| 2022/0351571 A1 | 11/2022 | Blackwelder et al. | |
| 2025/0285509 A1 | 9/2025 | Moshal | |

OTHER PUBLICATIONS

U.S. Appl. No. 19/217,735, filed May 23, 2025, Inventor: Martin Paul Moshal.

International Searching Authority; Notification of Transmittal of the International Search Report and the Written Opinion of the International Searching Authority, or the Declaration, PCT International Search Report and PCT Written Opinion of the International Searching Authority; all for International Application No. PCT/IB2024/056945 with notification of transmittal, mailing date: Sep. 30, 2024 (13 pages).

U.S. Appl. No. 19/295,429, filing date: Aug. 8, 2025, Inventor: Martin Paul Moshal.

U.S. Appl. No. 19/295,360, filing date: Aug. 8, 2025, Inventor: Martin Paul Moshal.

International Searching Authority; Notification of transmittal of the international search report and the written opinion of the international searching authority, or the declaration, the international search report, and the written opinion of the international searching authority (PCT Rule 43 bis. 1) for international patent application No. PCT/IB2025/057064; downloaded from the World Intellectual Property Office on Oct. 5, 2025.

* cited by examiner

163

| PLAYER | RAFFFLE TICKET ID. | TICKET COUNT |
|---|---|---|
| 1 | 1000 | 1 |
| 1 | 1001 | 2 |
| 1 | 1002 | 3 |
| 1 | 1003 | 4 |
| 1 | 1015 | 5 |
| 1 | 1016 | 6 |
| 1 | 1017 | 7 |
| 2 | 1011 | 8 |
| 2 | 1012 | 9 |
| 2 | 1013 | 10 |
| 2 | 1014 | 11 |
| 2 | 1024 | 12 |
| 2 | 1025 | 13 |
| 2 | 1026 | 14 |
| 2 | 1027 | 15 |
| 3 | 1018 | 16 |
| 3 | 1019 | 17 |
| 3 | 1020 | 18 |
| 3 | 1021 | 19 |
| 4 | 1004 | 20 |
| 4 | 1005 | 21 |
| 4 | 1006 | 22 |
| 4 | 1007 | 23 |
| 4 | 1008 | 24 |
| 4 | 1009 | 25 |
| 4 | 1010 | 26 |
| 4 | 1022 | 27 |
| 4 | 1023 | 28 |

↑ 151  ↑ 153  ↑ 155

165

| PLAYER | RAFFFLE TICKET ID. | TICKET COUNT |
|---|---|---|
| 2 | 1011 | 1 |
| 2 | 1012 | 2 |
| 2 | 1013 | 3 |
| 2 | 1014 | 4 |
| 2 | 1024 | 5 |
| 2 | 1025 | 6 |
| 2 | 1026 | 7 |
| 2 | 1027 | 8 |
| 4 | 1004 | 9 |
| 4 | 1005 | 10 |
| 4 | 1006 | 11 |
| 4 | 1007 | 12 |
| 4 | 1008 | 13 |
| 4 | 1009 | 14 |
| 4 | 1010 | 15 |
| 4 | 1022 | 16 |
| 4 | 1023 | 17 |

| OUTCOME DESCRIPTION | PAYOUT | PROBABILITY |
|---|---|---|
| NON-WINNING COMBINATION | 0 | 80.480% |
| CHERRY / ANY / ANY | 2 | 6.386% |
| ANY / ANY / CHERRY | 2 | 6.386% |
| CHERRY / CHERRY / ANY | 5 | 1.878% |
| ANY / CHERRY / CHERRY | 5 | 1.878% |
| CHERRY / ANY / CHERRY | 5 | 0.639% |
| CHERRY / CHERRY / CHERRY | 20 | 0.188% |
| BAR / LEMON / LEMON | 14 | 0.394% |
| LEMON / LEMON / BAR | 14 | 0.056% |
| LEMON / LEMON / LEMON | 20 | 0.394% |
| BAR / PLUM / PLUM | 10 | 0.188% |
| PLUM / PLUM / BAR | 10 | 0.047% |
| PLUM / PLUM / PLUM | 20 | 0.470% |
| BAR / BELL / BELL | 18 | 0.038% |
| BELL / BELL / BAR | 18 | 0.188% |
| BELL / BELL / BELL | 20 | 0.188% |
| BAR / BAR / BAR | 50 | 0.188% |
| 7 / 7 / 7 | 100 | 0.009% |
| TOTAL | | 100% |

FIG. 14

| OUTCOME DESCRIPTION | PAYOUT | PROBABILITY |
|---|---|---|
| NON-WINNING COMBINATION | 0 | 80.480% |
| CHERRY / ANY / ANY | 20 RAFFLE TICKETS | 6.386% |
| ANY / ANY / CHERRY | 20 RAFFLE TICKETS | 6.386% |
| CHERRY / CHERRY / ANY | 50 RAFFLE TICKETS | 1.878% |
| ANY / CHERRY / CHERRY | 50 RAFFLE TICKETS | 1.878% |
| CHERRY / ANY / CHERRY | 50 RAFFLE TICKETS | 0.639% |
| CHERRY / CHERRY / CHERRY | 200 RAFFLE TICKETS | 0.188% |
| BAR / LEMON / LEMON | 140 RAFFLE TICKETS | 0.394% |
| LEMON / LEMON / BAR | 140 RAFFLE TICKETS | 0.056% |
| LEMON / LEMON / LEMON | 200 RAFFLE TICKETS | 0.394% |
| BAR / PLUM / PLUM | 100 RAFFLE TICKETS | 0.188% |
| PLUM / PLUM / BAR | 100 RAFFLE TICKETS | 0.047% |
| PLUM / PLUM / PLUM | 200 RAFFLE TICKETS | 0.470% |
| BAR / BELL / BELL | 180 RAFFLE TICKETS | 0.038% |
| BELL / BELL / BAR | 180 RAFFLE TICKETS | 0.188% |
| BELL / BELL / BELL | 200 RAFFLE TICKETS | 0.188% |
| BAR / BAR / BAR | 500 RAFFLE TICKETS | 0.188% |
| 7 / 7 / 7 | $10.00 | 0.009% |
| | TOTAL | 100% |

FIG. 16

| OUTCOME DESCRIPTION | PAYOUT | PROBABILITY |
|---|---|---|
| NON-WINNING COMBINATION | 0 | 80.480% |
| CHERRY / ANY / ANY | 40 RAFFLE TICKETS | 6.386% |
| ANY / ANY / CHERRY | 40 RAFFLE TICKETS | 6.386% |
| CHERRY / CHERRY / ANY | 100 RAFFLE TICKETS | 1.878% |
| ANY / CHERRY / CHERRY | 100 RAFFLE TICKETS | 1.878% |
| CHERRY / ANY / CHERRY | 100 RAFFLE TICKETS | 0.639% |
| CHERRY / CHERRY / CHERRY | 400 RAFFLE TICKETS | 0.188% |
| BAR / LEMON / LEMON | 280 RAFFLE TICKETS | 0.394% |
| LEMON / LEMON / BAR | 280 RAFFLE TICKETS | 0.056% |
| LEMON / LEMON / LEMON | 400 RAFFLE TICKETS | 0.394% |
| BAR / PLUM / PLUM | 200 RAFFLE TICKETS | 0.188% |
| PLUM / PLUM / BAR | 200 RAFFLE TICKETS | 0.047% |
| PLUM / PLUM / PLUM | 400 RAFFLE TICKETS | 0.470% |
| BAR / BELL / BELL | 360 RAFFLE TICKETS | 0.038% |
| BELL / BELL / BAR | 360 RAFFLE TICKETS | 0.188% |
| BELL / BELL / BELL | 400 RAFFLE TICKETS | 0.188% |
| BAR / BAR / BAR | $10.00 | 0.188% |
| 7 / 7 / 7 | $20.00 | 0.009% |
|  | TOTAL | 100% |

FIG. 17

APPARATUS AND METHOD FOR A NON-GAMBLING GAME

FIELD

This disclosure relates to systems for providing a game that allows a participant to play at no cost, whenever and for as long as the participant wishes to play.

BACKGROUND

As used in this disclosure, the activity of placing a wager requires an individual player to place something of value, such as money, at risk. Further, as used in this disclosure, gambling requires the player to make a wager with the expectation that a random or unknown event will result in a return of value to the player that is larger than the wager. When an individual participates in a game of chance without any wager, even though the individual may predict (that is, "bet" on) a particular outcome in the game, such activity does not amount to gambling.

An example of a non-gambling game may be found in the so-called "sweepstakes casinos." In a sweepstakes casino, players cannot directly use cash to place a wager (that is, gamble) on games offered by the casino. Players can, instead, acquire so-called "gold coins" to play games offered by the casino. Gold coins are, in effect, a type of a virtual currency that has no redeemable value.

Gold coins are associated with "Sweeps Coins," which can also be used to play games offered by the casino. In contrast to Gold Coins, however, Sweeps Coins can be redeemed for cash awards or other prizes of value.

Players may obtain Sweeps Coins in a variety of different ways: For example, a player may:

Purchase gold coins and be given a proportional number of sweeps coins as a purchase bonus;

Be given sweeps coins as a sign-on bonus for signing up and creating an account with the casino;

Enter a contest and, if she or he wins the contest, receive sweeps coins without further charge; or Log in to a particular Sweepstakes Casino website repeatedly and thereby receive Sweeps Coins from the casinos as a loyalty bonus.

Further, in some cases (particularly if all other methods of obtaining Sweeps Coins require an individual to make purchase or spend money), the individual may also obtain Sweeps Coins simply by mailing to the Sweeps Casino a request for the coins. This last option is referred to as an Alternative Means of Entry ("AMOE").

AMOEs are commonly offered to ensure that there is no requirement for consideration to play the game, particularly in jurisdictions where only free-play games are allowed. Players who obtain Sweeps Coins via an AMOE typically have the same opportunity to win the same prizes or other awards as those who pay to play the game and are allowed to play as many times as those who pay to play the game.

Free play can be effected on an electronic gaming machine by, for example, simply giving virtual tokens to a player without charge. The provider of a game without a wagering requirement—essentially a free game—may offer the game as a gift to players, subsidizing the game platform from its savings or from the proceeds of other businesses. A provider may show advertisements to those playing the free games and obtain revenue from the entities whose advertisements are presented to the players. Revenue from such advertisement undertaking may be limited and cause the game provider to incur the costs of operating an advertising business.

Despite advances in the computing field, there is a continuing need to improve a process for a computing system to provide non-gambling games to players.

Overview

The present application discloses embodiments related to systems, methods, and apparatus that provide non-gambling games to players.

In a first aspect, a computing system receives individual registration data and thereafter initiates a game without any requirement of payment for a wager. The computing system provides a first mode of game operation upon detecting registration data corresponding to a base tier and provides an enhanced mode of game operation upon detecting registration data corresponding to a premium tier. The premium tier can be associated with a membership.

In a second aspect, a computing system having at least one processor and a computer-readable memory is provided. The memory has stored thereon program instructions that, if executed by the processor(s), effects a non-gambling game. Again, the game has a first mode of game operation upon detecting registration data corresponding to a base tier and provides an enhanced mode of game operation upon detecting registration data corresponding to a premium tier. The premium tier can be associated with a membership.

These aspects, as well as other embodiments, aspects, advantages, and alternatives will become apparent to those of ordinary skill in the art by reading the following detailed description, with reference where appropriate to the accompanying drawings. Further, this overview and other descriptions and figures provided in this disclosure are intended to illustrate embodiments using examples only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The above, as well as additional, features will be better understood through the following illustrative and non-limiting detailed description of example embodiments, with reference to the appended drawings.

FIG. 8 shows raffle ticket data, in accordance with example embodiments.

FIG. 14 shows a pay table, in accordance with example embodiments.

FIG. 16 shows a Bronze, Premium Tier pay table, in accordance with example embodiments.

FIG. 17 shows a Silver, Premium Tier pay table, in accordance with example embodiments.

All the figures are schematic, not necessarily to scale, and generally only show parts which are necessary to explain example embodiments, wherein other parts can be omitted or merely suggested.

DETAILED DESCRIPTION

I. Introduction and Overview

Aspects of the embodiments described in this disclosure can be suitable for use in the context of playing of games over a computer network. As will be appreciated from the following discussion, these aspects can be suitable for use in other environments, including land or ship-based casinos, as well as other types of wagering environments.

Figure 1:
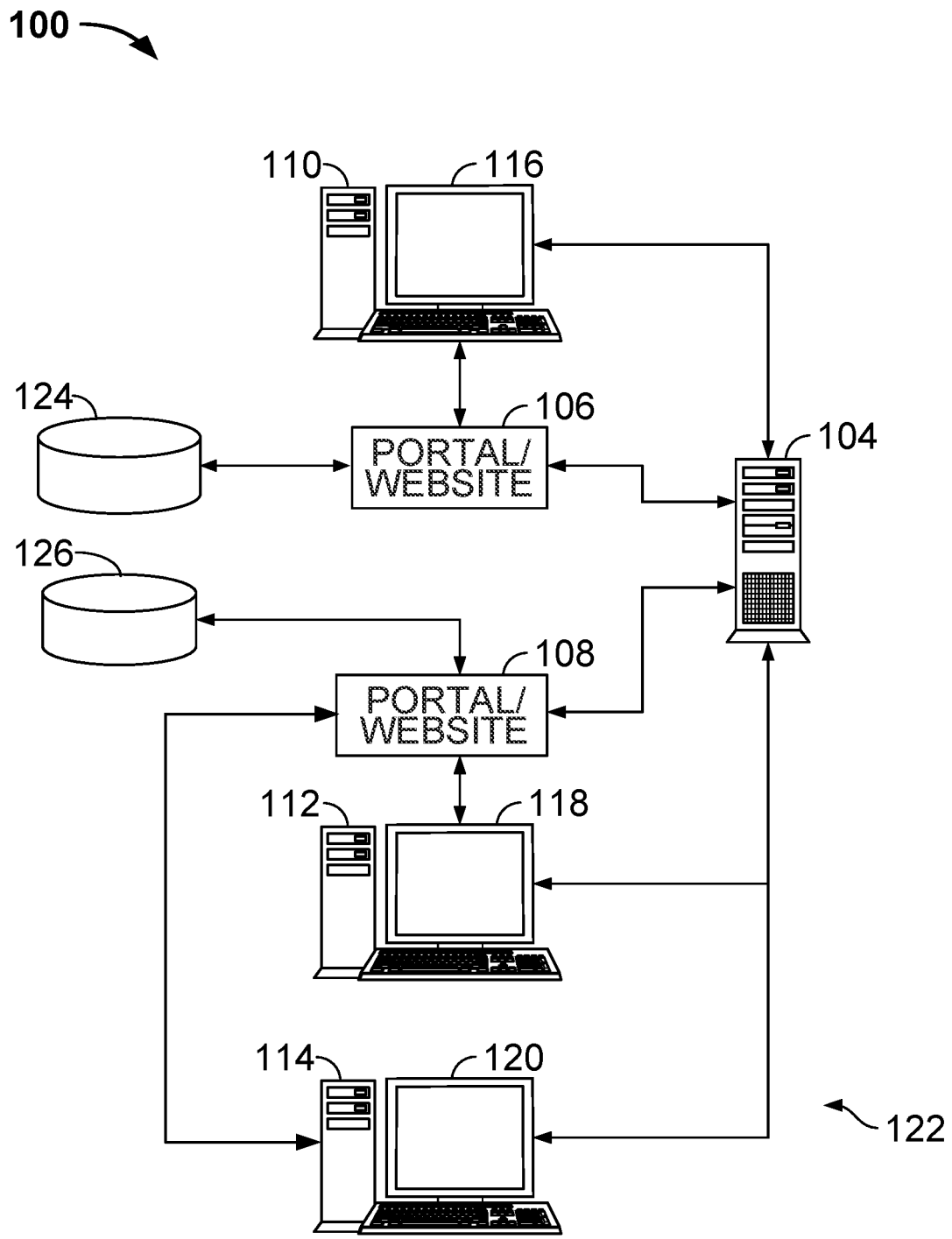
FIG. 1 is an illustration of a gaming environment in which workstations communicate with a gaming sever over a computer network, in accordance with example embodiments.
Figure 2:
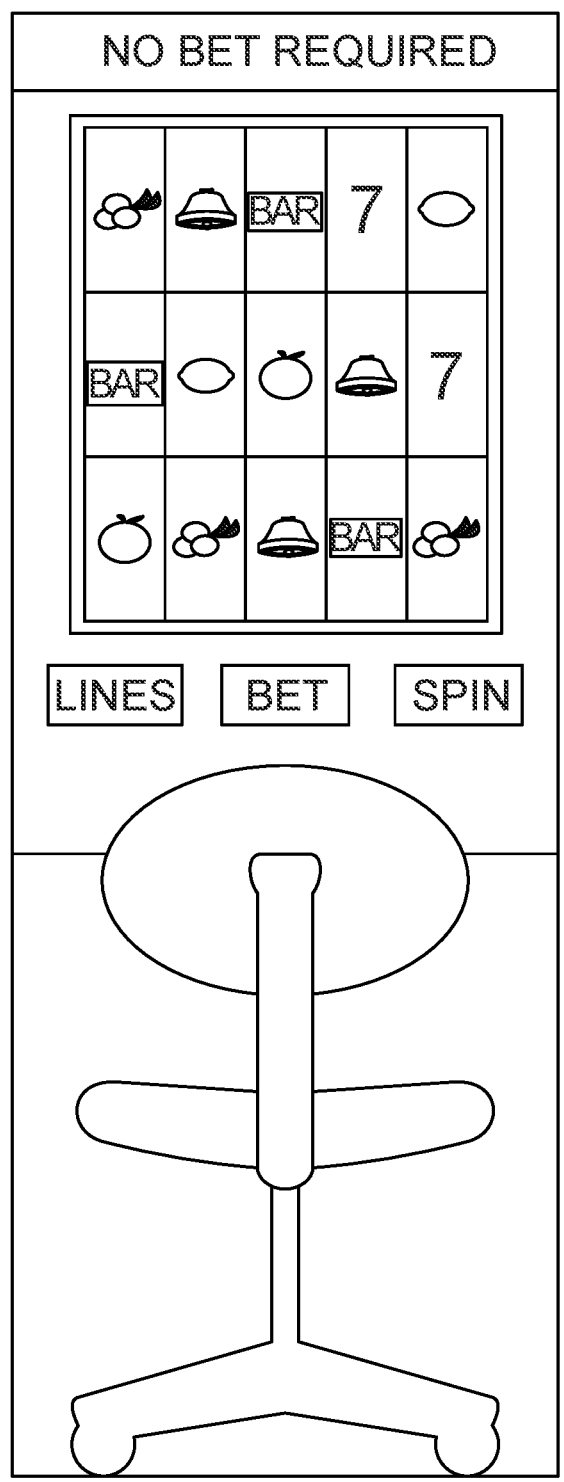
FIG. 2 is a front view of a standalone gaming machine, in accordance with example embodiments.

At least some of the embodiments pertain to performing aspects of a game using a computing system (e.g., a gaming system 100 shown in FIG. 1 or a standalone gaming machine 102 shown in FIG. 2). In at least some implementations, the standalone gaming machine 102 includes a dedicated slot machine. The machine can be configured as, or include, a computing system. For purposes of this description, unless the context dictates otherwise, a user device or machine can include or be embodied as either a discrete-component computer system or standalone machine.

Turning back to FIG. 1, the gaming system 100 is suitable for use in providing games to workstations operable by players. The gaming system 100 includes a server 104 and a website 106, 108. The server 104 can include one or more servers, each including one or more processors and one or more network interfaces providing connectivity to each other and/or to a communication network, such as the Internet. The website 106, 108 can include a website on the World Wide Web of the Internet. For example, one or more of the websites can include an online casino website hosted on a corresponding server application operable on the server 104. A person having ordinary skill in the art will understand that in some embodiments the gaming system 100 can include a single website, two websites, such as the website 106, 108, or more than two websites. The website 106, 108 can include and/or be accessed via a portal. The website 106, 108 can be served by the server 104. In that regard, the server 104 can include and/or be arranged as a web server. As an example, the server 104 can serve the website 106, 108 to a workstation using Hypertext Transfer Protocol (HTTP) communications or HTTP secure (HTTPS) communications. In at least some embodiments, the portal includes a website of an online casino from which websites for different games (e.g., different wagering or non-wagering games) can be selected and provided to a workstation. As an example, the different wagering or non-wagering games can include a slots game, a roulette game, a dominoes game, a card game, or a skills game.

The website 106, 108 can be accessible by an individual player using a gaming workstation 110, 112, 114 in the form of an Internet-enabled computer workstation. In at least some embodiments, the website 106 is logically connected to a gaming workstation 110, whereas the website 108 is logically connected to the gaming workstation 112, 114. It will be appreciated that the website 106, 108 can be logically connected to any desired number of such workstations simultaneously. In at least some embodiments, a website is logically connected to a workstation via one or more of a portal, server or communication network.

The server 104, the website 106, 108, and the gaming workstation 110, 112, 114 are capable of communicating with each other by means of a communication network 122 (such as an open communication network (e.g., the Internet or another type of Internet Protocol (IP) network).

The communication network 122 can include a wired communication network and/or a wireless communication network. In at least some embodiments, the communication network 122 includes a local area network (LAN), such as a LAN located at least partially within a casino. In accordance with those embodiments, the gaming workstation 110, 112, 114 can be dispersed throughout the casino and can communicate with the server 104.

In another example, the communication network 122 can include a wide-area network (WAN), such as an Internet network or a network of the World Wide Web. In such a configuration, the gaming workstation 110, 112, 114 can communicate with the server 104 via a website portal (for a virtual casino) hosted on the server 104. The data described herein as being transmitted by the server 104 to the gaming workstation 110, 112, 114 or by the gaming workstation 110, 112, 114 to the server 104 can be transmitted as datagrams according to the user datagram protocol (UDP), the transmission control protocol (TCP), or another protocol, and/or a file (e.g., an HTTP file) or some other type of file or communication.

The communication network 122 can include any of a variety of network topologies and network devices. The communication network 122 can include a wireless and/or wired network topology and network devices operable on one or both of those network topologies. As an example, the communication network 122 can include a public switched telephone network, a cable network, a cellular wireless network, a wide area network (WAN), a local area network, an IEEE® 802.11 standard for wireless local area networks (wireless LAN) (which is sometimes referred to as a WI-FIR standard) (e.g., 802.11a, 802.11ax, 802.11ay, 802.11az, 802.11ba, 802.11bd, 802.11g, 802.11n, or 802.11p), and/or a network operating according to a BLUETOOTH® standard (e.g., the BLUETOOTH® standard 5.4) developed by the Bluetooth Special Interest Group (SIG) of Kirkland, Washington.

The website 106, 108 can include and/or operate a player account facility 124, 126, respectively, with a credit account corresponding to each player who participates in a game offered by the website 106, 108. In the illustrated embodiment, therefore, the player account facility 124 has at least one player credit account associated with it, while the player account facility 126 has at least two associated, but separate, player accounts.

The following description refers to the gaming workstation 110 and is applicable to one or more of the gaming workstation 112, 114 and/or one or more other workstations. A stored workstation program can be resident in the gaming workstation 110. This program can enable a participating player to browse an online casino website (e.g., the website 106, 108) and to interact with the server 104 to play games such as slot machines (slots), poker, Black Jack, and Roulette. The stored workstation program can include tools (e.g., modules) for displaying, on the gaming workstation 110, gaming symbols (e.g., slot machine reels, cards, Roulette wheels, etc.), gaming controls by which the player can place wagers, spin the reels, etc., and the results of play. The stored workstation program can also include gaming logic for facilitating the execution of a turn of a game, and communications facilities for communicating player actions to the server 104, and receiving messages (e.g., datagrams) from the server 104 containing results of play. The data representing results of play can be translated to graphical symbols which are presented on the gaming workstation 110.

In at least some implementations, the gaming workstation 110 includes a personal computer programmed to perform a method according to the example embodiments. In other implementations, the gaming workstation 110 includes a portable computing device programmed to perform a method according to the example embodiments. As an example, the portable computing device can comprise a tablet device, a personal digital assistant, or a smart phone. In still other implementations, the gaming workstation 110 includes an electronic gaming terminal programmed to perform a method according to the example embodiments and/or that is wholly or partially dedicated to playing casino games.

The server 104 can operate under control of a server-stored program that co-operates with the stored workstation program in order to enable a player at the gaming workstation 110 to play a game. As an example, the server-stored program can be contained in a memory 158 shown in FIG. 4 and FIG. 6, the memory 158A shown in FIG. 5. As another example, the server-stored program can be contained within the application 164 or the program instructions 166, both shown in FIG. 6.

The stored workstation program or application and the corresponding stored server program will be referred to, for convenience, as a client process and a server process, respectively. The server process can generate one or more random events that determine the outcome of turns of the game, such as determining the outcome of spins of the slot machine reels in the various slots games of the participating players. The client process of any particular workstation (such as the gaming workstation 110) can obtain the result of the random events from the server 104 along the communication network 128 and can display the outcome of the game on the gaming workstation 110. For example, the client process can cause the player's set of slots reels to spin and to come to rest at a position corresponding to the outcome.

In order to play the games from any particular workstation, the client process can first be downloaded to that computer workstation from the server 104 or, alternatively, from a separate web server, and then installed on the gaming workstation 110.

A program that is arranged to execute on either the server 104 or the gaming workstation 110 can reside on a non-transitory computer-readable memory, such as random access memory (RAM) or read only memory (ROM), which can encompass magnetic memory, optical memory, and/or additional forms of computer memory. The computer-readable memory can have stored thereon program instructions that, if executed by a computing device (e.g., the server 104 or the gaming workstation 110), cause the computing device to perform operations consistent with any of the embodiments described in this disclosure.

A player wishing to participate in a game can use the gaming workstation 110 to access the website 106, 108 of her or his choice. When the player navigates using a web browser to a home page of a casino, the player can be presented with an icon on the graphical user interface (GUI) of the gaming workstation 110, which the player can activate and/or select to trigger downloading the client process and providing to the casino operator (e.g., to the server 104) information for the casino operator to verify the identity of the player. In at least some embodiments, that information can include at least a portion of registration information previously proved to the casino operator to register the player. Following these tasks, the player can request to play games provided on the casino website by clicking on an appropriate icon or taking other similar action.

A computing system and/or a display screen of the computing system can display a variety of symbols during operation of a game or other outcome event. During the turn of a game, an event with an uncertain outcome (such as number generated by a random number generator) becomes certain. A resultant pattern of symbols appearing on the gaming workstation 110 becomes certain after the event occurs (e.g., the number is generated and the resultant pattern of symbols on the display is fixed. In at least some other embodiments, the resultant pattern of symbols appearing on the gaming workstation 110 becomes certain after the event occurs and after a user is permitted to nudge one or more symbols to a new position, a user is permitted to replace a symbol, or a bonus spin of one or more reels occurs.

A wide range of games is available to players. One popular example is a game provided via a slot machine, which can be implemented in a variety of forms. A slot machine can include one or more reels, each of which includes multiple symbols distributed around the circumference of the reel. A computing system that includes a graphical user interface (GUI) that can emulate the physical, spinning wheels of a mechanical slot machine.

In at least some embodiments, a player initiates the turn of game, causing the reels to start spinning. Each reel then comes to rest, typically with either one of the symbols, or a space in between adjacent symbols, in alignment with a payline or payway. According to at least some embodiments, a winning outcome of a game can be based on symbols being displayed according to a predefined pattern of symbols. The pattern can be defined as a payline of a line-type outcome event, or a payway of a ways-type outcome event.

In accordance with the example embodiments, a pattern that results in an award can include one of multiple, particular patterns that starts at either side of a symbol-display portion of a display (e.g., a left side or a right side). Some embodiments utilize multiple, particular patterns.

Free play on a mechanical slot machine can be implemented, of course, by providing physical tokens to a player without charge. A free play on an electronic slot machine can be implemented, for example, by providing virtual tokens to a player without charge.

Another popular game is a game that includes spinning a roulette wheel with consecutive integers 1 to 35 with or without a 0 or consecutive integers 1 to 36 with or without a 0. The roulette wheel includes a pocket corresponding to each number on the roulette wheel. A roulette ball (also, known as a pill) can be placed on the roulette wheel while spinning. An outcome of the roulette game is based on the number corresponding to the pocket in which the roulette ball lands and one or more numbers selected by the player before the roulette game starts. A free play on an electronic roulette wheel machine can be implemented, for example, by providing virtual tokens to a player without charge.

Still another popular game is a game that includes spinning a prize wheel and stopping the prize wheel with a particular position on the prize wheel positioned at a prize wheel position indicator. A free play on an electronic prize wheel machine can be implemented, for example, by providing virtual tokens to a player without charge.

Throughout this description, the articles "a" or "an" are used to introduce elements of the example embodiments. Any reference to "a" or "an" refers to "at least one" or "one or more," and any reference to "the" refers to "the at least one" or "the one or more," unless otherwise specified, or unless the context clearly dictates otherwise. The intent of using the conjunction "or" within a described list of at least two terms is to indicate any of the listed terms or any combination of the listed terms.

Further, as the present disclosure relates to providing a game, such as a video slot game, without gambling (or placing money at risk), the terms, "bet," and "wager" should be taken to mean a prediction or other choice by a player of what an uncertain outcome will be where the player has not put money at risk.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures can be used in combination with one another. Thus, the figures should be generally viewed as component aspects of one or more overall example embodiments, with the understanding that not all illustrated features are necessary for each embodiment.

II. Example Architecture

Figure 3:
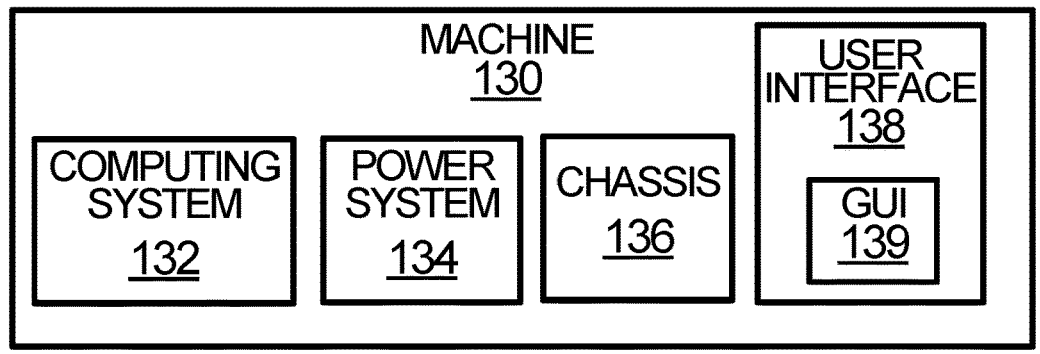
FIG. 3 is a functional, block diagram of a machine, in accordance with example embodiments.

FIG. 3 is a generalized, block diagram of a machine 130 in accordance with the example embodiments, including both the gaming system 100 (FIG. 1) and the standalone gaming machine 102 (FIG. 2). The machine 130 includes a computing system 132, a power system 134, a chassis 136, and/or a user interface 138. The machine 130 can be configured to perform a method or at least some functions of a method according to the example embodiments. In at least some embodiments, the computing system 132 can include at least a portion of one or more from among: the power system 134, the chassis 136, or the user interface 138.

The computing system 132 can include a processor and a memory storing program instructions executable by the processor to perform a method or at least some functions of a method according to the example embodiments. As an example, the computing system 132 can be arranged as and/or include components of any computing system described in this description and/or shown in the drawings. In particular, the computing system 132 can be arranged as and/or include components of a computing system 140 shown in FIG. 4, a computing system 140A shown in FIG. 5, or a computing system 140B also shown in FIG. 5.

The power system 134 includes means for powering some portion of the machine 130, such as the computing system 132 and/or the user interface 138. The power system 134 can include a power supply, such as a battery, a generator, a fuel cell, or a solar cell, or some other type of power supply instead or in addition. The power system 134 can include a power circuit for distributing electrical power throughout the machine 130 where needed. The power system 134 can include a connector and/or connection for connecting to another power system, such as a power system within a building and/or a power system of an electrical utility company.

The chassis 136 includes means for supporting and/or protecting other aspects of the machine 130. As an example, the chassis 136 can include a rack for supporting at least portions of the computing system 132, the power system 134, and/or the user interface 138. As another example, the chassis 136 can include a housing in which at least portions of the computing system 132, the power system 134, and/or the user interface 138 reside.

The user interface 138 can include one or more user interface input components configured to receive and/or produce content (e.g., a signal, data, and/or information) based on some action of a player. That content can be provided to the computing system 132. The user interface 138 can include one or more user interface output components (e.g., a GUI 139) for outputting content. That content can be provided by the computing system 132. The player action can occur by use of the user interface 138.

In at least some example embodiments, the user interface 138 also includes a mechanical user interface input component, such as an arm, handle or lever located on a side of the chassis 136 similar to an arm, handle, or lever located on a mechanical slot machine, or a roulette wheel and roulette ball. As an example, the mechanical user interface input component can be configured to input a spin request or a start input to the computing system 132.

Also in some example embodiments, the user interface 138 can include a card reader to determine a player using the machine 130. The user interface 138 can also include a payout device, by which a winning player can receive a payout from a successful wager. A payout by the device can include, for example, paper money or coins, physical tokens, a raffle ticket payout (e.g., one or physical or virtual raffle tickets), an electronic interface upon which a credit can be uploaded, a receipt that can be exchanged for money, a credit added to the player's account, an increase in to a player's raffle or drawing ticket balance, or an electronic funds transfer. A payout can also include electronically transmitted data to effect a payout to a player. The display can advise a player she or he has received a payout and if any action is required by the player to receive the payout.

In at least some embodiments, the computing system 132 includes at least a portion of the user interface 138. As an example, in embodiments in which the computing system 132 is arranged like the computing system 140, the computing system 140A, or the computing system 140B, the user interface 138 can be arranged like the user interface 144, the user interface 144A, or the user interface 144B, respectively.

Figure 4:
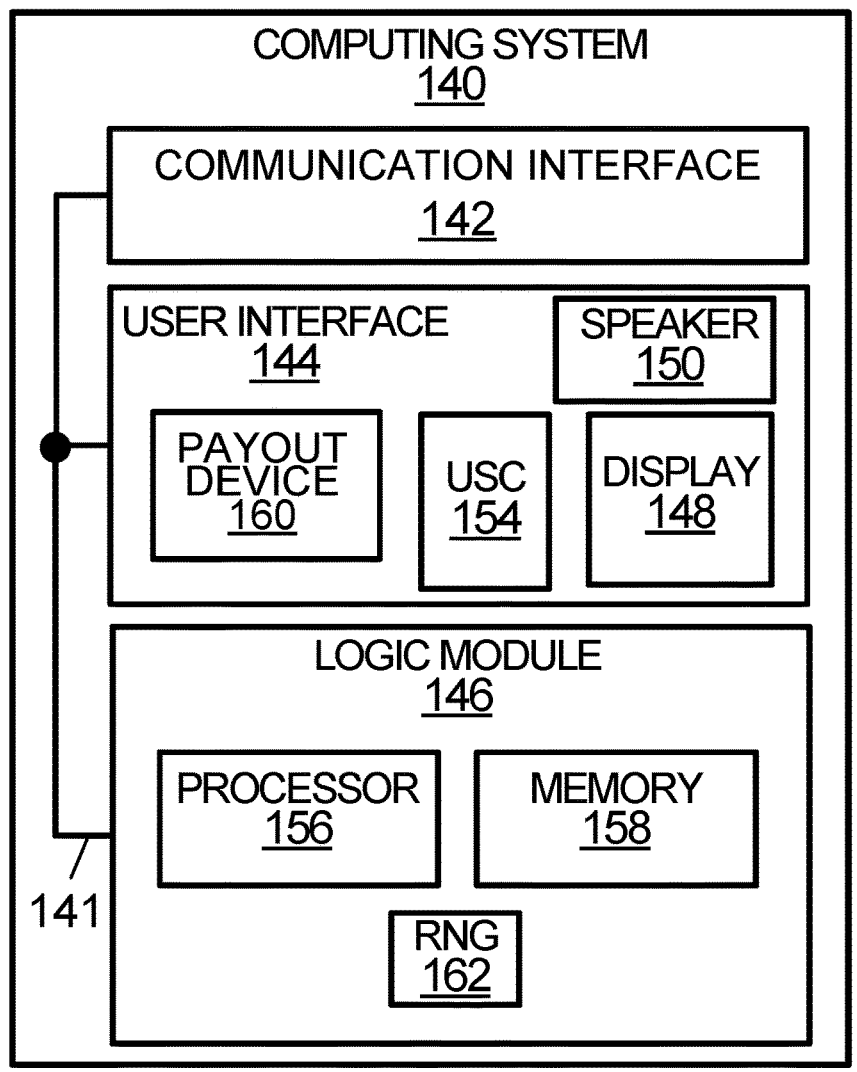
FIG. 4 is a block diagram of a computing system, in accordance with example embodiments.

Next, FIG. 4 is a block diagram of a computing system 140 in accordance with the example embodiments. As described in the text corresponding to FIG. 1 and FIG. 2, the computing system 140 of example embodiments can be arranged as and/or include a stand-alone computing system (such as shown in FIG. 2), a distributed computing system, a personal computer, a server computing system (or more simply, a "server"), a client computing system (or more simply, a "client"), a portable computing system, a mobile phone, a smartphone, a tablet device, or some other computing device (as set forth throughout the description). The computing system 140 can also be referred to as a user device, a player device, or a workstation.

The computing system 140 can include a communication interface 142, a user interface 144, and a logic module 146, two or more which can be coupled together by a system bus 141 (e.g., a network, or other connection mechanism). The communication interface 142 can include a wired or wireless network communication interface. For purposes of this description, any data described as being provided, sent, or transmitted by the computing system 140 can be data sent by the communication interface 142 over a communication network, such as the communication network 122. In addition, for purposes of this description, any data described as being received by the computing system 140 can be data sent to communication interface 142 over a communication network, such as the communication network 122.

The user interface 144 includes components that can facilitate interaction with a user of the computing system 140. For example, the user interface 144 can include user interface output components, such as a display 148, a speaker 150, and/or a payout device 160. As another example, the user interface can include user interface input components, such as a user-selectable control (USC) 154 (e.g., a keypad, a keyboard, or a mouse), or a touch-sensitive screen. The touch-sensitive screen can be part of the display 148, such that the display 148 is operable as both a user interface input component and a user interface output component. The user-selectable control 154 can include one or more user-selectable controls, one or more of which can be implemented on the touch sensitive screen (which can also be referred to as a touch pad). In at least some embodiments, the USC 154 can be used to input a start input. In at least some other embodiments, the USC 154 can be used to select a number on a roulette wheel.

The display 148 is configured to display (i.e., visually present and/or show) content. As an example, the content can correspond to an outcome event, such as a set of symbols selected for the outcome event, a matrix, a reel, a payline, a payway, an award, an instruction, or a user-selectable control (e.g., a button). As another example, the content can include text, a graphic, a GUI (e.g., the GUI 139), an animation, a video, or some other content as well or instead. As yet another example, the content can include content shown in and/or described with respect to any of the content of FIG. 9 to FIG. 13. The display 148 can include a display screen (e.g., a display panel or a graphical display unit) including a quantity of pixels.

Additionally, the display 148 and/or the display screen can include and/or be arranged as a liquid crystal display (LCD), a light emitting diode (LED) display, an organic LED (OLED) display, a plasma display or some other type of display. Furthermore, the display 148 can embody the touch sensitive screen noted above such that the display 148 and/or display screen includes and/or is arranged as a touch screen display. Different displays, of course, allow the presentation of graphics greater or lesser quality.

The logic module 146 can include and/or be arranged as a processor 156, a memory 158, and/or a random number generator (RNG) 162. The processor 156 can include a general-purpose processor (e.g., a microprocessor) or a special-purpose processor (e.g., a graphics process, a digital signal processor or an application specific integrated circuit) and can be integrated in whole or in part with the communication interface 142 or the user interface 144. Any memory discussed in this description or shown in the drawings can be referred to as a computer-readable memory, data storage, computer-readable data storage, among other names.

The memory 158 can include volatile or non-volatile storage components and can be integrated in whole or in part with the processor 156. The memory 158 can take the form of a non-transitory computer-readable memory and can include software program instructions, that when executed by the processor 156, cause the computing system 140 to perform one or more of the functions set forth in this disclosure. Any software program instructions discussed in this description or shown in the drawings can be referred to as computer-readable program instructions, or more simply, program instructions, or a software application. A set of program instructions (e.g., a portion of a software application) can be referred to as a module or a logic module.

Figure 20:
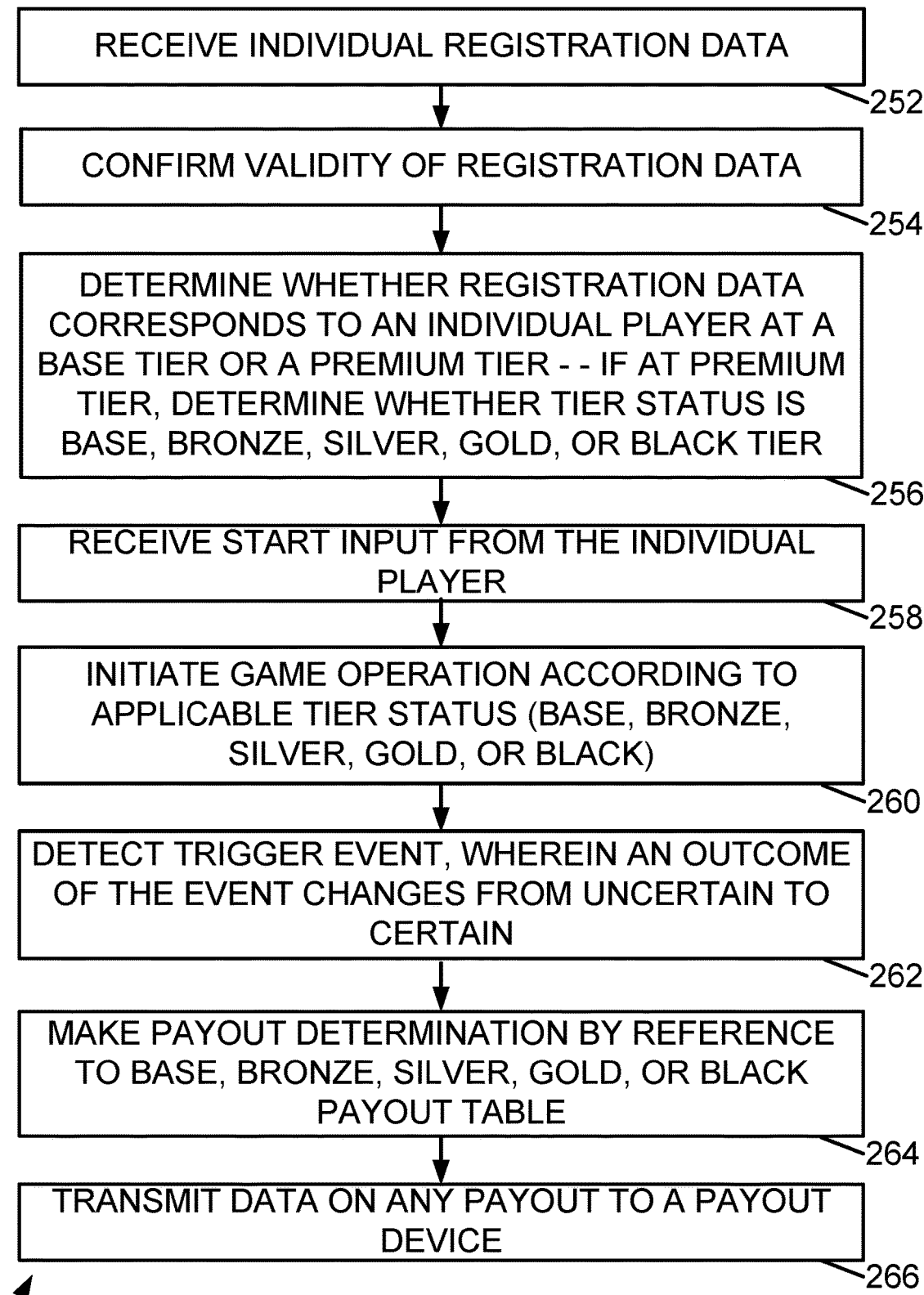
FIG. 20 is a flow chart showing functions of a method for a non-gambling gaming machine, in accordance with example embodiments.
Figure 21:
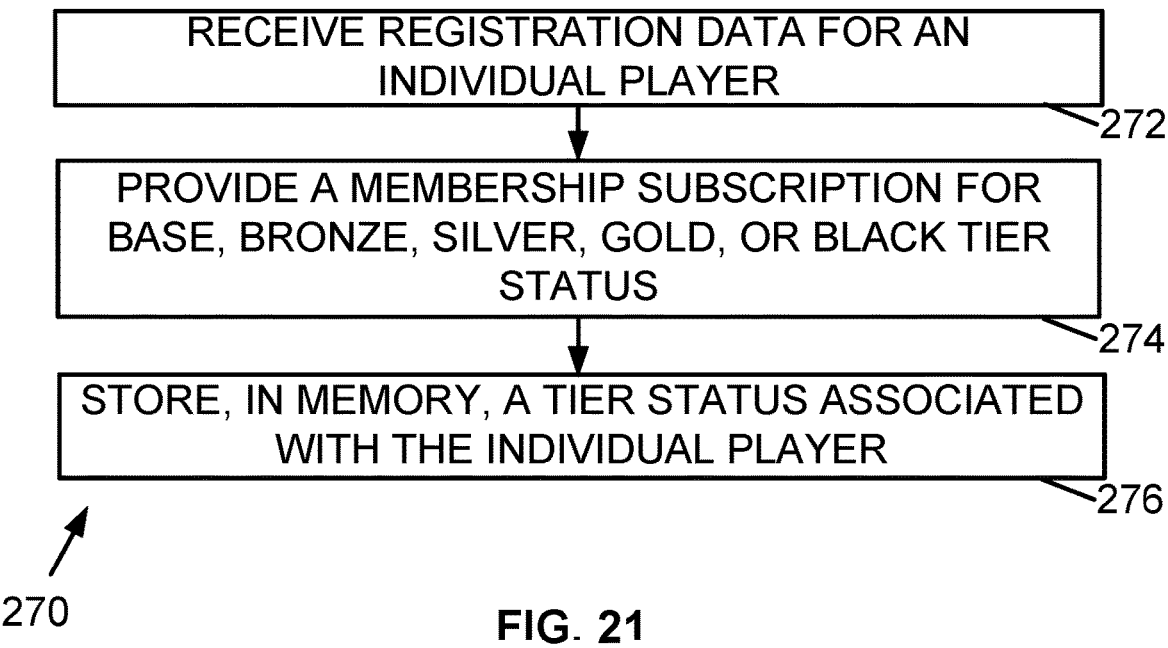
FIG. 21 is a flow chart showing a method for an individual player to register for a Premium Tier status, in accordance with example embodiments.
Figure 22:
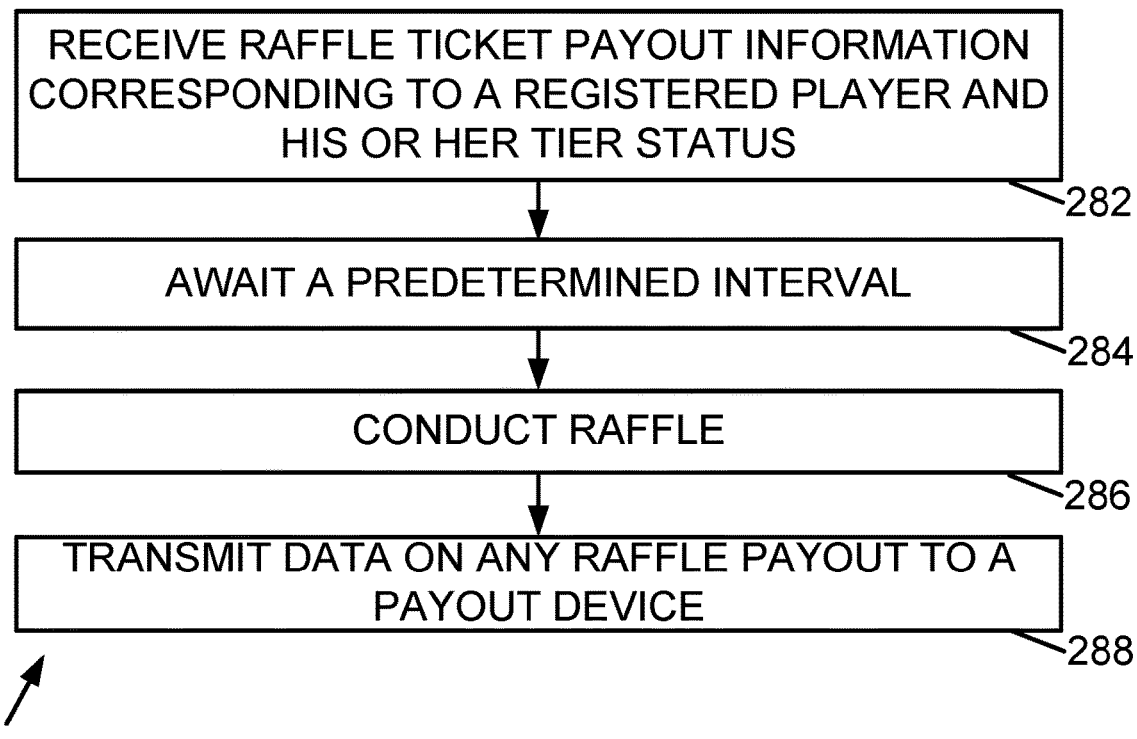
FIG. 22 is a flow chart showing a method for a raffle, in accordance with example embodiments.

As an example, the program instructions can be executable by the processor 156 to perform a method, such as a method including one or more of the functions shown in FIG. 20 to FIG. 22.

As another example, the program instructions can be executable by the processor 156 to determine an input has been received at the user interface 144 and thereafter allow an outcome to be output in response to the received input.

The memory 158 can also include operating system software on which the computing system 140 can operate. The memory 158 can include a database. As an example, the memory 158 can include a credit account database containing data related to performing an outcome event by a computing system, as well as adjusting account balances (e.g., quantities of credits) associated with client computing systems. In at least some embodiments, the memory 158 includes the player account facility 124, 126. The processor 156 can write data into the database and read data within the database.

Figure 5:
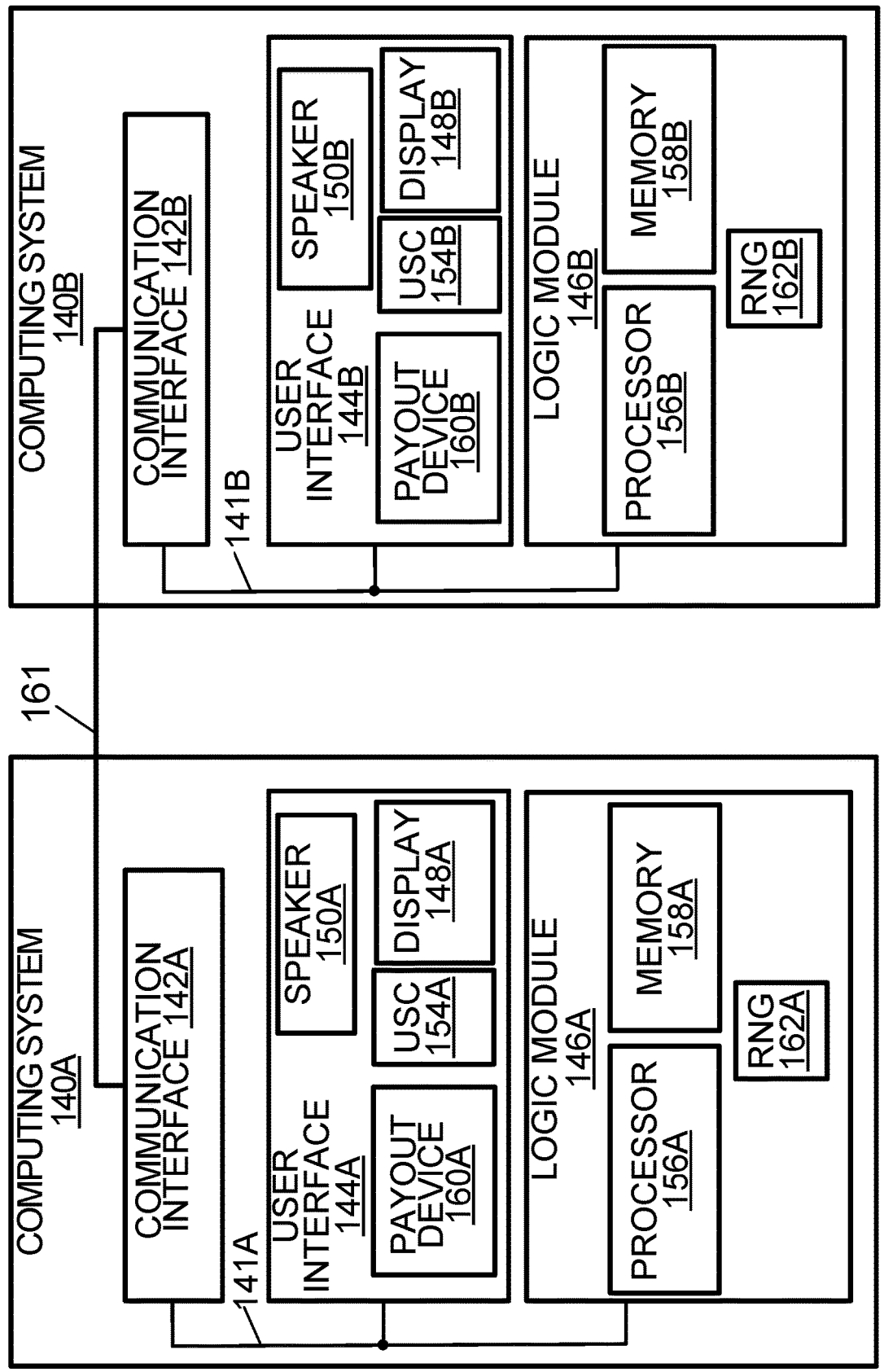
FIG. 5 is a block diagram of two computing systems connected to one another via a computer network, in accordance with example embodiments.

Next, FIG. 5 is a block diagram of a computing system 140A connected to a computing system 140B over a communication network 161. A configuration of elements including the computing system 140A and the computing system 140B can be referred to as a server-client based configuration. In at least some embodiments, the server 104 can be arranged like the computing system 140A and/or the gaming workstation 110, the gaming workstation 112, and/or the gaming workstation 114 can be arranged like the computing system 140B.

The components of the computing system 140A and the computing system 140B are shown with corresponding "A" and "B" reference numerals (i.e., based on the computing system 140). For example, the computing system 140A includes a communication interface 142A, a user interface 144A (which includes a display 148A, a speaker 150A, a user-selectable control (USC) 154A, and/or a payout device 160A), and a logic module 146A (which includes a processor 156A, a memory 158A, and/or an RNG 162A). Likewise, the computing system 140B includes a communication interface 142B, a user interface 144B (which includes a display 148B, a speaker 150B, a user-selectable control 154B, and/or a payout device 160B), and a logic module 146B (which includes a processor 156B, a memory 158B, and/or an RNG 162A).

The computing system 140A is configured to communicate with the computing system 140B over the communication network 161. Likewise, the computing system 140B is configured to communicate with the computing system 140A over the communication network 161. For purposes of this description, any data described as being sent or transmitted by the computing system 140A can include data sent by the communication interface 142A over the communication network 161. Similarly, any data described as being sent or transmitted by the computing system 140B can include data sent by the communication interface 142B over the communication network 161. Furthermore, for purposes of this description, any data described as being received by the computing system 140A can include data the computing system 140A receives from the communication network 161 using communication interface 142A. Similarly, any data described as being received by the computing system 140B can include data the computing system 140B receives from the communication network 161 using the communication interface 142B.

In at least some embodiments, the communication network 161 includes a local area network (LAN), such as a LAN located at least partially within a casino. In accordance with those embodiments, multiple instances of the computing system 140B dispersed throughout the casino can communicate with the computing system 140A. In some cases, the computing system 140A can be located within the casino. In some other cases, the computing system 140A can be located away from the casino.

In another example, the communication network 161 can include a wide-area network (WAN), such as an Internet network or a network of the World Wide Web. In such a configuration, the computing system 140B can communicate with the computing system 140A via a website portal (for a virtual casino) hosted on the computing system 140A. The data described in in this disclosure as being transmitted by the computing system 140A to the computing system 140B or by the computing system 140B to the computing system 140A can be transmitted as datagrams according to the user datagram protocol (UDP), the transmission control protocol (TCP), or another protocol, and/or a file (e.g., a hypertext transfer protocol file) or some other type of file or communication.

The communication network 161 can include any of a variety of network topologies and network devices. The communication network 161 can include and/or be part of the communication network 122 (FIG. 1). The examples described herein with respect to the communication network 122 are applicable to the communication network 161.

In at least some embodiments, the computing system 140 (e.g., the payout device 160) can also physically dispense a corresponding award or payout (e.g., cash, raffle tickets, drawing ticket(s)), or otherwise facilitate the payout. In those embodiments, the computing system 140 can include a payout device 160 configured to physically disburse items of value to the payer. Using the payout device 160 to provide item(s) of value can trigger the logic module 146 debiting funds of an electronic account associated with a customer card or transmit data to the player account facility 124, 126 or other player accounts to effect a transfer of value from the account to the payer. As an example, the payout device 160 can include a coin hopper, a coin counter, a coin dispenser, and/or a coin tray. As another example, the payout device 160 can include a ticket roll, a ticket reel configured to hold a ticket roll, a ticket printer, a ticket counter, and/or a ticket dispenser. As yet another example, the payout device 160 can include a bill (i.e., currency) chamber, a bill counter, and/or or a bill dispenser. As still yet another example, the payout device 160 can include a kiosk configured to issue a payout (e.g., a payout based on a ticket voucher (dispensed by the ticket dispenser) corresponding to the payout).

In at least some embodiments, an activity by the payout device 160 can be triggered by a cash out button either on the display 148 or elsewhere on the computing system 140. Additionally or alternatively to determining the payout amount, the computing system 140 can perform other actions to award the player. For instance, the computing system 140 can display an indication of a tangible prize. Additionally or alternatively, a payout output by the payout device 160 or another portion of the computing system 140 (e.g., the processor 156 and/or the communication interface 142) can include an electronic funds transfer (EFT). Other types of awards can be used as well.

For purposes of this description, a function that can be performed by the computing system 140, the computing system 140A, or the computing system 140B can be performed, at least in part, by a processor of that computing system executing program instructions and/or a software application. Those program instructions and/or software application can be stored within the memory 158, 158A, or 158B, respectively.

The memory 158, 158A, and 158B can also store data. The memory 158, 158A, 158B can include a global symbol group for an outcome event that includes multiple symbols, such as a reel-based outcome event. Such an image can be arranged according to the Joint Photographic Experts Group (JPEG), Graphics Interchange Format (GIF), or Portable Network Graphics (PNG) encodings, for example.

A memory can include one or more memories. For example, a memory can include the memory 158. As another example, a memory can include the memory 158A and the memory 158B. In accordance with this latter example, a memory can be arranged as a distributed memory. One or more processors can be operatively coupled to a memory. For example, the processor 156 is operatively coupled to the memory 158. As another example, the processor 156A is operatively coupled to the memory 158A, and the processor 156B is operatively coupled to the memory 158B. In accordance with this latter example, a processor can be arranged as a distributed processor.

During the course of an event such as a game operation, various symbol sets can be selected for display. Each selected symbol set can be stored in a table such as a selected symbol set table. Similarly, the payouts associated with various game outcome case be stored in memory as table, such as the pay tables shown in FIG. 14 to FIG. 19.

Figure 6:
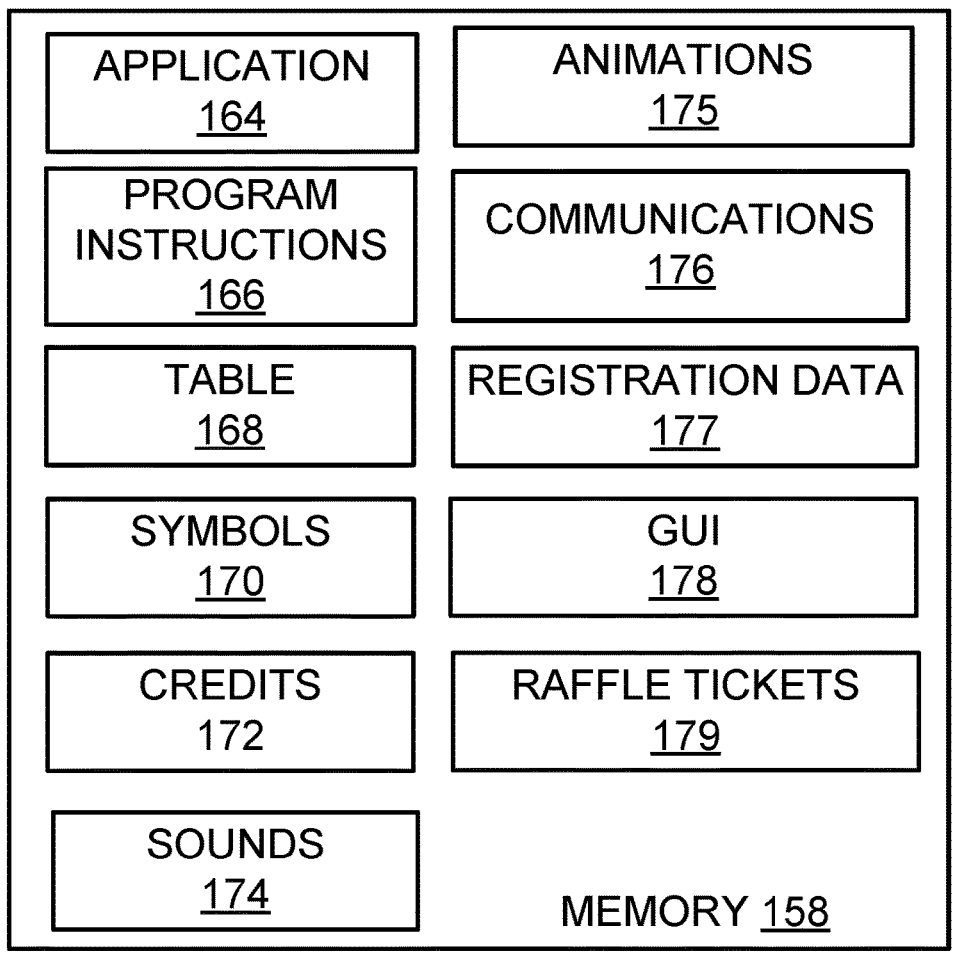
FIG. 6 shows data stored in a memory, in accordance with example embodiments.

In at least some embodiments, the computing system 140 determines each symbol of a selected symbol set table by randomly selecting any symbol from within the symbols 170 (shown in FIG. 6). The random selection is enabled by the output of the RNG 162, 162A, 162B in the logic module 146, 146A, 146B, respectively.

Next, FIG. 6 shows the memory 158 and data that can be stored in the memory in accordance with the example embodiments. The memory 158A (shown in FIG. 5) can contain at least some of the data stored in the memory 158. Likewise, the memory 158B (shown in FIG. 5) can contain at least some of the data stored in the memory 158. In at least some embodiments, at least a portion of the memory 158 is embodied as a data register within the processor 156.

As shown in FIG. 6, the memory 158 can include one or more of the following: an application 164, program instructions 166, a table 168, symbols 170, credits 172, sounds 174, animations 175, communications 176, registration data 177, a GUI 178, or raffle tickets 179.

The application 164 can include any software application discussed in this description. The application 164 can also include an operating system, such as any operating system described in this description. As an example, the application 164 can include a browser application for executing on the computing system 140B. As another example, the application 164 can include an application configured to interface with an application programming interface (API). In accordance with that example, the API can include interface output on the display 148B to allow a user to enter via the user interface 144B data to store within the registration data 177 or data to identify a registered user wishing to play a game via the computing system 140B or to change (e.g., upgrade or downgrade a membership from a first level to a second level).

The program instructions 166 are computer-readable program instructions (e.g., machine readable instructions) executable by one or more processors. The program instructions 166 can be executable to cause a computing system or a component of the computing system to perform any function described in this description. In at least some embodiments, the program instructions include one or more application of the application 164.

The table 168 can include one or more tables, such as one or more pay tables shown in FIG. 14 to FIG. 19. In at least some embodiments, the memory 158 can contain any data described as being stored in a table in some manner other than a table. As an example, the memory 158 can store program instructions that include data described as being contained in a table. In at least some embodiments, the table 168 includes one or more tables of a database, such as a table containing at least a portion of the registration data 177. In at least some embodiments, the table 168 includes table including identifiers and corresponding index values, such as quantity N index values and N identifiers, as shown in Table A. As an example, the table of identifiers and index values can include a table of animation identifiers and corresponding index values, a table of sound identifiers and corresponding index values, a table of GUI identifiers and corresponding index values, or a table of reel stop position identifiers and corresponding index values. As shown in Table B discussed with respect to FIG. 13 below, an index value can correspond to multiple identifiers.

TABLE A

| Index value | Identifier |
|---|---|
| 1 | ID-1 |
| 2 | ID-2 |
| 3 | ID-3 |
| 4 | ID-4 |
| 5 | ID-5 |
| N | ID-N |

The symbols 170 can include computer-readable data a processor can read to generate a symbol on a display, a display screen, a graphical display unit, a graphical display interface, or a GUI. As an example, the symbols 170 can include a respective computer-readable file (e.g., a bitmap file) for each symbol. As another example, the symbols 170 can include a computer-readable file a processor can read to generate any symbol required for a game. A table, such as a symbol image table, can include an index value (e.g., a numerical identifier or a file name) corresponding to a symbol in the symbols 170. See Table B below.

The credits 172 can include a number of credits available for a player. The number of credits can be referred to as a credit value. If the credits 172 are stored in the memory 158B, the credits can include a number of credits available for a user of the computing system 140B. If the credits 172 are stored in the memory 158A, the credits can include a respective number of credits available for a user of a respective computing system arranged like the computing system 140B. A processor can update the credits available for each player based on awards earned by use of the computing system by that player. The credit value can be output on the display 148, 148A, 148B. The number of credits can represent a number of sweeps coins. Additionally or alternatively, the number of credits can represent a number of raffle tickets. Based on that example, the number of credits can represent one or more different types of credits. In at least some embodiments, the credit value can be based upon a quantity of coins (e.g., sweeps coins) or a number of credits based on AMOEs received by a player.

The sounds 174 include audio files (e.g., an audio clip) that the processor 156 can output to a speaker. Outputting an audio file can include outputting a signal that produces a particular sound when the signal passes through a speaker. As an example, the particular sound can include a first particular sound to play when reels are spinning on the display 148B or a second particular sound to play when symbols are being upgraded between outcome events. As another example, the sounds 174 can include an audio file, such as an audio file with one of the following file name extensions: WAV, MP3, MP4, WMA, or some other file name extension. The sounds 174 can include sounds for different tiers, such as sounds for a base tier and sounds for a premium tier. The sounds for a premium tier can include sounds for a first premium tier and other sounds for a second premium tier.

Each sound in the sounds 174 can correspond to an index value such that the processor 156A can provide the processor 156B with an instruction including a particular index value so that the processor 156B outputs via the speaker 150B an audio file corresponding to the particular index value. Accordingly, the processor 156A does not have to transmit the audio file to the processor 156B each time the audio file is to be output via the speaker 150B.

The animations 175 can include computer-readable files containing animations on a display, such as the display 148, 148A, 148B. As an example, the animations 175 can include animation files, such as an animation file with one of the following file name extensions: GIF, PNG, JPEG, SVG, or some other file name extension. Each animation in the animation 175 can correspond to an index value such that the processor 156A can provide the processor 156B with an instruction including a particular index value so that the processor 156B outputs via the display 148B an animation file corresponding to the particular index value. Accordingly, the processor 156A does not have to transmit the animation file to the processor 156B each time the animation file is to be output via the display 148B.

In at least some embodiments, an animation of the animations 175 is an entire graphical display output on display 148, 148A, 148B. In at least some other embodiments, an animation of the animations 175 is a portion of a graphical display output on the display 148, 148A, 148B. Moreover, in at least some of those latter embodiments, multiple animations of the animations 175 are respective portions of a graphical display output on the display 148, 148A, 148B. The animations 175 can include animations for different tiers, such as animations for a base tier and animations for a premium tier. The animations for a premium tier can include animations for a first premium tier and other animations for a second premium tier. In at least some embodiments, the animations 175 can include an advertisement. In at least some embodiments, the animations 175 can include an animation shows a set of reels spinning and stopping to display a set of symbols on one or more paylines or payways.

The communications 176 include one or more communications, such as one or more of the following: a communication sent by the processor 156, a communication generated for transmitting by the processor 156, or a communication received by the computing system 140. As an example, for embodiments in which the communications 176 are stored in the memory 158A, the communications 176 can include a communication sent by the processor 156A to the computing system 140B, a communication generated for transmitting by the processor 156A, or a communication received by the computing system 140A. As another example, for embodiment in which the communications 176 are stored in the memory 158B, the communications 176 can include a communication sent by the processor 156B to the computing system 140A, a communication generated for transmitting by the processor 156B, or a communication received by the computing system 140B.

The registration data 177 can include registration data for one or more players or would-be players of games at or via the computing system 140, 140A, 140B. As an example, the registration data can include a list of relevant information on individual players, including name, contact information, account information, password associated with the player, whether the player has purchased a membership subscription and, if so, the tier.

The GUI 178 can include one or more GUIs. As an example, the GUI 178 can include a GUI that the computing system 140A transmits to the computing system 140B, and that computing system 140B stores within the memory 158B and displays on the display 148B. As another example, the GUI 178 includes a GUI of an application stored in the application 164 and that is populated within data provided by the computing system 140A. As an example, the data provided by the computing system 140A can include data indicating an outcome of an instance of playing a game (e.g., a game described in this description). As another example, the GUI 178 can include the GUI 180 shown in FIG. 9. As yet another example, the GUI 178 can include a GUI populated with an animation of the animations 175. As still yet another example, the GUI 178 can include field(s) corresponding to registration data required for registering a player and a USC selectable to cause the computing system 140B to transmit a communication with the registration data.

The raffle tickets 179 include raffle ticket data generated by a processor of the gaming system 100, the computing system 140, 140A, 140B. The raffle ticket data can include raffle ticket identifiers and player identifiers to whom a raffle ticket was awarded. FIG. 8 shows a raffle ticket pool 163, 165 in accordance with example embodiments. The raffle ticket pool 163, 165 includes player identifiers 151, raffle ticket identifiers 153, and a ticket count 155. As shown in FIG. 8, a raffle ticket pool can include player identifiers for multiple different players. A raffle ticket pool could include a player identifier for a single player. As shown in FIG. 8, a raffle ticket pool can include multiple different raffle ticket identifiers. A raffle ticket pool could a raffle ticket identifier for a single raffle ticket. As shown in FIG. 8, a raffle ticket pool can include a respective integer corresponding to each raffle ticket.

The raffle ticket pool 163 include four play identifiers for a first player "ID 1," a second player "ID 2," a third player "ID3," and a fourth player "ID4." Based on the raffle ticket pool 163, the first player has been awarded seven raffle tickets, the second player has been awarded eight raffle tickets, the third play has been awarded four raffle tickets, and the fourth player has been awarded nine raffle tickets. A total of twenty-eight tickets have been awarded. A person skilled in the art will understand that a raffle ticket pool for a particular raffle can include a different number of raffle tickets for four players or some other numbers of players. A raffle ticket pool can include metadata regarding the raffle ticket pool, such as a time period corresponding to the raffle ticket pool such as a time period including a date, a start time, and an end time (e.g., Jan. 1, 2024, 1:00.00 AM to 1:15:00 AM).

In accordance with at least some of the embodiments, the raffle ticket pool 163 can include raffle ticket identifiers for all raffle tickets awarded by the gaming system 100 during the time period. A processor of the gaming system 100 or the computing system 140, 140A, 140B can select a raffle ticket from the raffle ticket pool 163 as a winning raffle ticket for the time period. In at least some embodiments, the processor can select from among all raffle tickets awarded during the time period multiple winning tickets for a time period. In at least some embodiments, the processor can select a raffle ticket from a raffle ticket pool that is a subset of another raffle ticket pool as a second chance winning raffle ticket. As an example, the raffle ticket pool 165 is a subset of the raffle ticket pool 163. In accordance with at least some embodiments, a subset of another raffle ticket pool can include the raffle tickets awarded to all players subscribing to one or more premium tiers during the time period. As an example, the second and fourth players can be associated with the Gold tier.

The processor 156, 156A, 156B can use the RNG 162, 162A, 162B, respectively, based on the ticket count corresponding to a raffle ticket pool. As an example, to select a winning raffle ticket from the raffle ticket pool 163, the processor can use the RNG to select a number from the range of 1 to 28 listed in the ticket count. Likewise, to select a winning raffle ticket from the raffle ticket pool 165, the processor can use the RNG to select a number from the range of 1 to 17 listed in the ticket count. The selected number corresponds to the winning raffle ticket.

In accordance with at least some embodiments, a raffle can be conducted after a threshold number of raffle tickets have been awarded upon initializing the gaming system 100 or after conducting a previous raffle. Based on the raffle ticket pool 163, the raffle can be conducted after twenty-eight raffle tickets have been awarded. In at least some embodiment, a number of raffle tickets greater than the threshold number can be awarded before the raffle is conducted. For example, the threshold number could be twenty-five tickets and the threshold can be reached upon the raffle ticket having identifiers 1024 to 1027 have been awarded to the second player.

Figure 9:
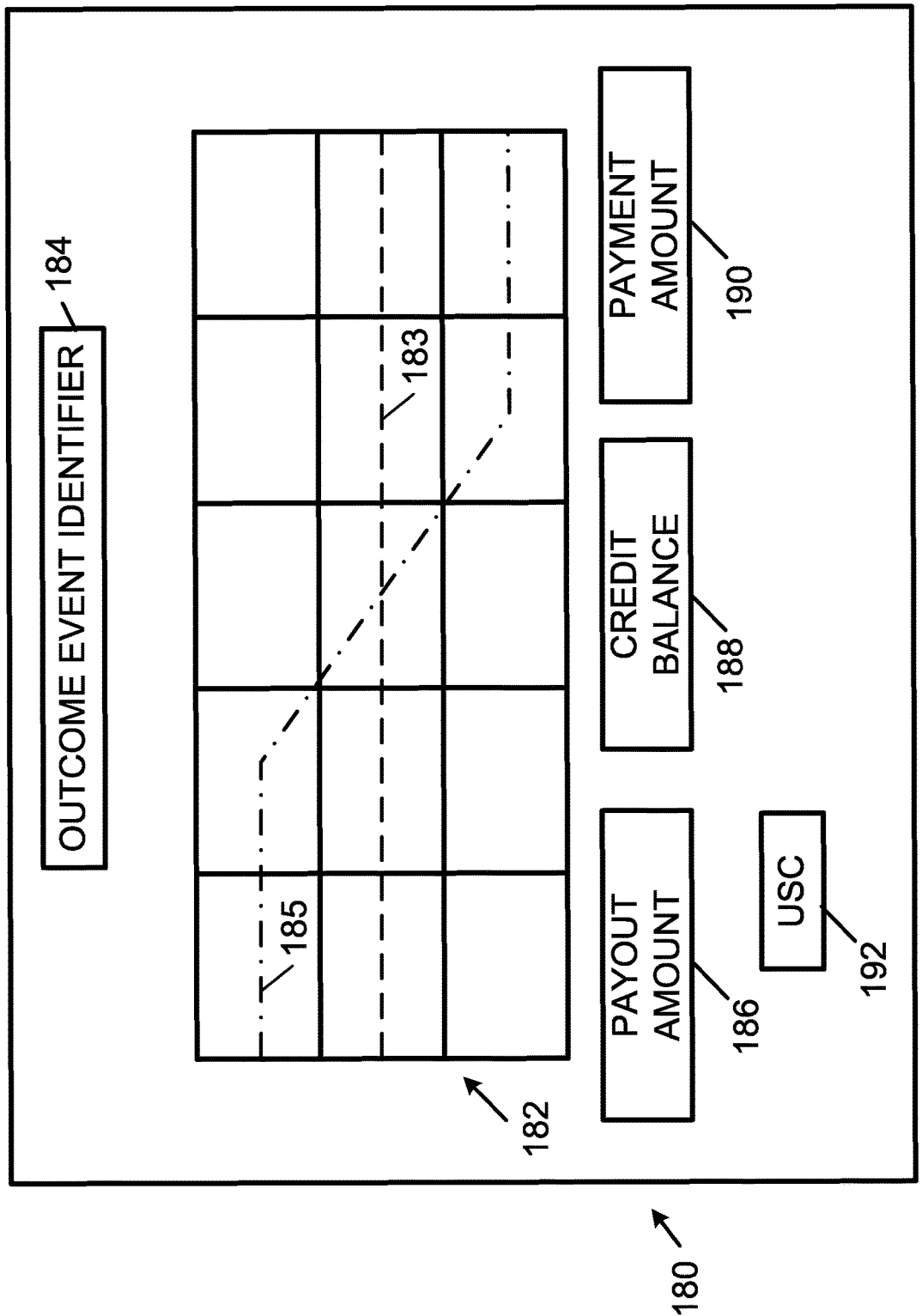
FIG. 9 is a simplified illustration of a graphical user interface (GUI) game page, in accordance with example embodiments.
Figure 10:
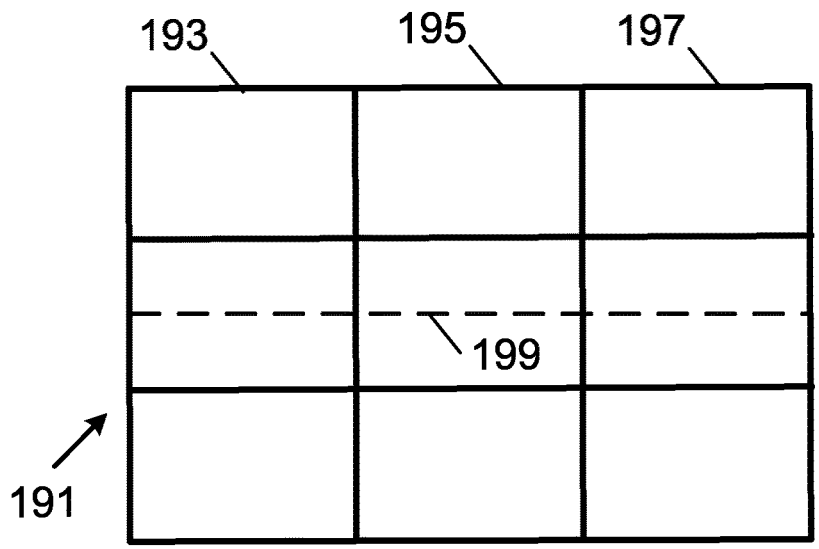
FIG. 10 shows a symbol-display-portion, in accordance with example embodiments.

Next, FIG. 9 depicts a GUI 180 that a computing system (e.g., the computing system 140) can present on a display (e.g., the display 148). For purposes of this description, each element of the GUI 180 can be a displayable element of the GUI 180. One or more of the displayable elements can include a static element that does not change. One or more of the displayable elements can include a dynamic element that is configured to be modified. A processor can determine how the dynamic element is to be changed. In some implementations, a change to the dynamic element can be based on a user input and/or an output of a random number generator.

The GUI 180 includes a symbol-display-portion 182, an outcome event identifier 184, a payout amount indicator 186, a credit balance indicator 188, and a payment amount indicator 190. The GUI 180 can also include one or more user-selectable controls (USCs), such as a USC 192 selectable to input a start input and/or to trigger a spinning of reels represented by the symbol-display-portion 182.

The symbol-display-portion 182 can include multiple symbol-display-segments and multiple symbol positions. As an example, the symbol-display-segments can include both vertical and horizontal symbol-display-segments. A person skilled in the art will understand that those symbol-display segments can be configured variety of different ways. The symbol-display-portion 182 can be referred to as a symbol matrix or, more simply, a matrix. Each column of symbol-display segments can be arranged as a respective reel. FIG. 9 depicts a payline/payway 183, 185 in accordance with the example embodiments. In at least some embodiments, a slots game can result in a win if three symbols along a payline/payway match a set of symbols in a pay table. Other examples of paylines or pay way within the symbol-display-portion 182 or examples of winning arrangements of symbols are also possible.

The processor of a computing system described in this disclosure can determine an operating state of the computing system and/or an outcome event that can occur during the determined operating state. In response to making those determination(s), the processor can cause the outcome event identifier 184 to display an identifier of the outcome event (e.g., a loss or a win of one or more raffle tickets) that can occur during the determined state. For example, the outcome event identifier 184 can identify a game outcome event where a previously uncertain event outcome (e.g., a pattern of symbols on a video slot game) has become certain.

The processor of a computing system described in this disclosure can determine one or more of the following: (i) a payment amount (e.g., a quantity of sweeps coins) entered to perform an outcome event, (ii) an award (e.g., a quantity of raffle tickets won during occurrence of an outcome event resulting in a win), or (iii) a credit balance (e.g., a quantity of sweeps coins or raffle tickets) after the turn of a game. The processor can cause the determined payout amount to be displayed by the payout amount indicator 186, the determined credit balance to be displayed by the credit balance indicator 188, and the determined payment amount to be displayed by the payment amount indicator 190.

In at least some embodiments, a memory (e.g., the memory 158, 158A, 158B) can include a pay table. Moreover, in at least some of those embodiments, a processor (e.g., the processor 156, 156A, 156B) can read at least a portion of the pay table within the memory. In at least some embodiments, the processor can output at least a portion of the table on a user interface (e.g., the user interface 144, 144A, 144B). The pay table can indicate various sets or combinations of symbols that are defined as a winning outcome and an award or payout corresponding to each winning outcome.

An award corresponding to one or more of the winning outcomes can include an award of one or more credits (e.g., raffle tickets) added to a credit meter balance (another type of payout device) contained in a memory for a user using the computing system 140B.

The GUI 180 can include one or more user-selectable controls (USCs). Activation of a USC by a player can cause the processor 156B and/or another component of the computing system 140B to perform one or more functions. As an example, selection of the USC 192 can cause the processor 156B to transmit a spin request and/or a communication including a spin request. As another example, selection of the USC 192 can cause the processor 156B to receive a start input to initiate performance of a game. The computing system 140B can perform multiple instances of a game until the processor determines an outcome event for an instance of the game includes a winning combination on a payline or payway.

In at least some embodiments, the program instructions include a module of program instructions or logic executable by the processor 156, 156A, 156B to perform one or more functions of any method described in this description and/or shown in the drawings. As an example, the program instructions 166 can include one or modules of the module 80 shown in FIG. 7. In accordance with at least some of the example embodiments, the program instructions and/or a module in the module 80 can be written in an object oriented programming language such as Java, Python, or C++, or a functional programming language, such as the Python programming language, or a procedural programming language, such as the "C" programming language. The Python language supports object-oriented and functional programming.

Figure 7:
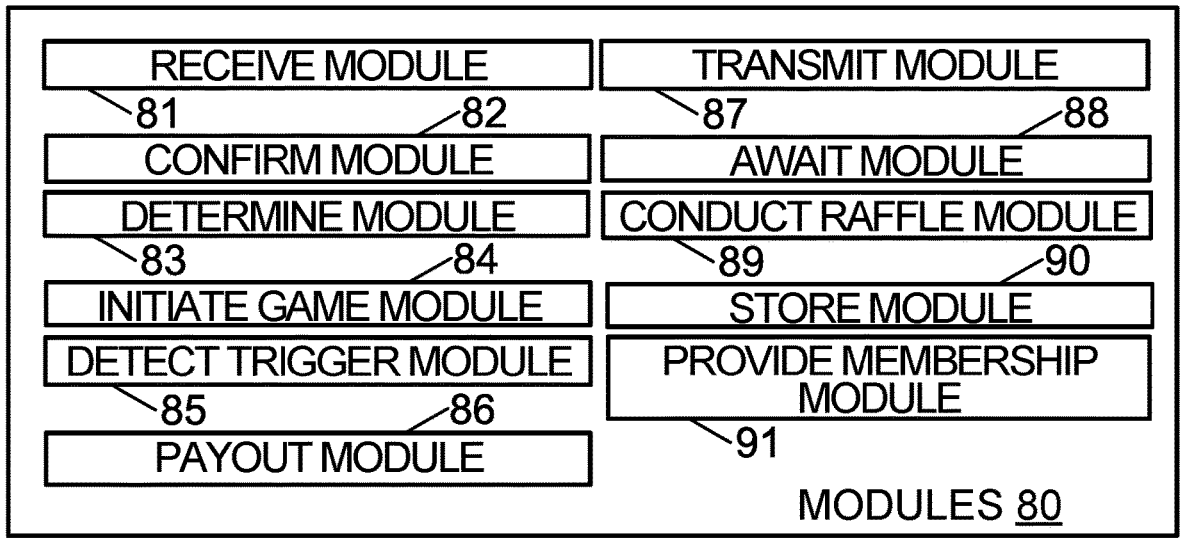
FIG. 7 shows modules, in accordance with example embodiments.

As shown in FIG. 7, the module 80 can include one or more of the following: a receive module 81, a confirm module 82, a determine module 83, an initiate game module 84, a detect trigger module 85, a payout module 86, a transmit module 87, an await module 88, a conduct raffle module 89, a store module 90, or a provide membership module 91. Two or more modules can executed in combination to carry out one or more functions.

The receive module 81 can be configured to receive a communication transmitted over a communication network. The receive module 81 can be configured to receive a communication at the communication interface 142, 142A, 142B and/or at the processor 156, 156A, 156B. The receive module 81 can be configured to receive a communication transmitted over the system bus 141, 141A, 141B.

As an example, the receive module 81 can be configured to receive registration data for an individual player. Examples of the registration data are described throughout this description. The registration data can be received to register a player. The registration data can be received after the player has registered so that the player can modify a registration (e.g., change a subscription) or to notify a computing system that the player is accessing the computing system to perform a game.

As yet another example, the receive module 81 can be configured to receive data (e.g., a digital signal or an analog voltage) indicating a user-selectable control at a computing system (e.g., a USC displayed on the display 148B) has been selected. For instance, the receive module 81 can be configured to receive data indicating the USC 192 has been selected. In particular, the receive module can be configured to receive data indicating a start input has been receive or data indicating a cash-out of an award (e.g., raffle tickets and/or currency) has been selected.

As still yet another example, the receive module 81 can be configured to receive raffle ticket payout information corresponding to a registered player and his or her tier status. For instance, the raffle ticket payout information can include a payout in the payout 228 (shown in FIG. 14 to FIG. 19) corresponding a particular set of symbols that landed on a payline or payway.

As still yet another example, the receive module 81 can be configured to receive a communication including an index value transmitted by the server 104 or the computing system 140, 140A. Examples of the index value are described throughout the description. As noted, receiving an index value can be carried out more efficiently than receiving a larger quantity of data associated with the index value. The data associated with the index value can be stored in the memory 158B.

The confirm module 82 can be configured to confirm data received at a computing system. For example, the confirm module 82 can be configured to confirm the validity of the registration data, such as registration data transmitted from the gaming workstation 110, 112, 114 to the server 104 or from the computing system 140B to the computing system 140A. As an example, the confirm module can be configured to determine whether all required aspects of registration data have been received and are sufficient for registering a player with the gaming system 100 and prompting the player to correct or provide further data for registering the player. For instance, if the player omits providing an area or country code associated with the player's smartphone, the confirm module 82 can be configured to prompt the player to provide the omitted data.

As another example, a processor can compare registration data previously stored in the memory to registration received via a communication after the player is registered with the gaming system. For instance, the processor can compare a player name, personal information, a password or some other portion of the registration stored in the memory as the registration data 177 to like types of registration data received via the post-registration communication, provided by the player with the corresponding information held in memory. As another example, the computing system can employ two-factor verification, sending a text message to a mobile phone number found in memory and, upon receiving a responsive affirmation from the mobile phone, confirm the identity of the player.

The determine module 83 can be configured to determine whether registration data corresponds to an individual player at a base tier or a premium tier. As an example, the determine module 83 can compare a player identifier for a player requesting to play a game via the computing system to player identifiers in the registration data 177 and upon determining a match, determining which tier corresponds the player identifier in the registration data 177 that matches the player identifier for the player requesting to play the game. If the processor determines the registration data corresponds to the premium tier, the processor determines which premium tier corresponds to the registration data if more than one premium tier is available. Additionally, the determine module 83 can be configured to determine a membership subscription for the player is active and to prompt the player to update the membership subscription (e.g., pay a membership fee) to become active again if the subscription is current inactive.

The initiate game module 84 can be configured to initiate a game operation according to an applicable tier status (e.g., a base, bronze, silver, gold, or black tier status corresponding to the individual player). As an example, the game can include a video slot game and initiating the game operation can include spinning reels containing symbols. Subsequently, the initiate game module 84 can cause the reels to stop spinning so that a particular combination of symbols lands on a payline or payway. As another example, the game can include a video roulette game and initiating the game operation can include spinning the roulette wheel. Subsequently, the initiate game module 84 can cause the roulette wheel to stop with a roulette ball located with a pocket of the roulette wheel. As yet another example, the game can include a video prize wheel game and initiating the game operation can include spinning the prize wheel. Subsequently, the initiate game module 84 can cause the prize wheel to stop with a particular position of the prize wheel located at a prize wheel position indicator.

The detect trigger module 85 can be configured to detect a trigger event, wherein an outcome of the event changes from uncertain to certain. As an example, the detect trigger module 85 can be configured to use an RNG to determine an outcome of the game and to select an animation to output on a display to show performance of the game, as well as whether the outcome, once certain, represents a winning outcome. As another example, the detect trigger module 85 can be configured to detect the trigger event by determining a number using the RNG corresponds to a stop position for each reel 218, 220, 222 within the symbol-display-portion 191. As another example, the detect trigger module 85 can be configured to detect the trigger event by detecting a pattern of symbols within the symbol-display-portion 182, 191 has become fixed. As another example, the detect trigger module 85 can be configured to detect the trigger even by determining a number corresponding to a pocket on a roulette wheel in which a roulette ball lands or will land based on an animation selected for a roulette game. As yet another example, the detect trigger module 85 can be configured to detect the trigger event by determining a position of a prize wheel at which the prize wheel will stop in proximity to a prize wheel position indicator.

The payout module 86 can be configured to make a payout determination for a game. As an example, the payout module 86 can be configured to determine the payout by referring to a pay table (e.g., a pay table in one of FIG. 14 to FIG. 19) and determining whether the symbols that landed on a payline or payway of a video slot game match an outcome description in the pay table. If the payout module determines a match to the outcome description, the payout module 86 can determine the payout that corresponds to the matching outcome description. As another example, for a video roulette game, the payout module 86 can be configured to determine the payout by referring to a pay table for a roulette game and to one or more numbers on the roulette wheel selected by a player. As yet another example, for a video prize wheel game, the payout module 86 can be configured to determine a payout represented on a prize wheel at a position of the prize wheel that stopped at a prize wheel position indicator.

The transmit module 87 can be configured to transmit a communication over a communication network. The transmit module 87 can be configured to transmit a communication via the communication interface 142, 142A, 142B and/or via the processor 156, 156A, 156B. The transmit module 87 can be configured to transmit a communication over the system bus 141, 141A, 141B.

As an example, the transmit module 87 can be configured to transmit data on any payout (e.g., a raffle payout) to a payout device, such as the payout device 160, 160A, 160B. In at least some embodiments, the payout for a player having a base tier membership can indicate a quantity of raffle tickets, whereas the payout for a player having a premium tier membership can indicate a quantity of raffle tickets and/or a monetary amount. As an example, the data on the payout can contained within an HTTP communication.

As still yet another example, the transmit module 87 can be configured to transmit a communication including an index value transmitted to a computing system 140B or the gaming workstation 110, 112, 114. Examples of the index value are described throughout the description. As noted, transmission of an index value can be carried out more efficiently than transmitting a larger quantity of data associated with the index value.

The await module 88 can be configured to await a predetermined interval. The predetermined interval can be temporal, such as a 15, 30, or 60 minute interval. The await module can implement a timer to track an amount of time since the most-recently performed raffle was performed. Alternatively, the predetermined interval can be distribution-based, such as the distribution of a threshold quantity of raffle tickets since the most-recently performed raffle was conducted. The await module 88 can implement a counter to count the distributed threshold tickets. Completion of the time interval or distributing the threshold number of tickets can trigger execution of the conduct raffle module 89.

The conduct raffle module 89 can be configured to conduct a raffle. As an example, the conduct raffle module 89 can be configured to select one or more raffle tickets from a pool of raffle tickets based on raffle tickets distributed since a prior raffle was conducted. In accordance with the raffle ticket pool 163 shown in FIG. 8, the conduct raffle module 89 can be configured to select one of the raffle ticket 1000 to raffle ticket 1027 as the winning raffle ticket. As another example, the conduct raffle module 89 can be configured to select a winning raffle ticket of a second-chance raffle based on at least a portion of the pool of raffle tickets after a winning raffle ticket has already been selected form the pool as a winning raffle ticket. In at least some embodiments, the conduct raffle module 89 can use an RNG to select the winning raffle ticket by selecting a ticket count corresponding to the raffle ticket. In at least some other embodiments, the conduct raffle module 89 can use an RNG to select the winning raffle ticket by selecting a raffle ticket identifier from the raffle ticket identifiers for the pool of raffle tickets.

The store module 90 can be configured to store data into a memory (i.e., write data into the memory 158, 158A, 158B). As an example, the store module 90 can be configured to store data into volatile memory in response to receiving the data and then writing the data into non-volatile memory in response to a USC selectable to save the data. As another example, the store module 90 can be configured to store a tier status associated with the individual player. In accordance with at least some embodiments, storing the tier status can include storing data that indicates the tier status is a base, bronze, silver, gold or black tier status, and storing the tier status can be stored within the registration data 177.

The provide membership module 91 can be configured to provide a membership subscription. As an example, the provide membership module 91 can be configured to provide the membership subscription requested by a player. If the requested subscription is a base tier, the provide membership module 91 can provide a base tier level subscription without any payment. Alternatively, if the requested subscription is a premium tier, the provide membership module 91 can provide a premium tier level subscription in response to receiving a proscribed payment. As another example, the provide membership module 91 can be configured to request the store module 90 to store data in the registration data 177 that indicates the player is associated with the applicable membership subscription.

While one or more disclosed functions have been described as being performed by certain computing systems. (e.g., the computing system 140, the computing system 140A, or the computing system 140B), one or more of the functions can be performed by any entity, including but not limited to those described in this disclosure. As such, while this disclosure includes examples in which the computing system 140A performs select functions and sends data to the computing system 140B, such that the computing system 140B can perform complementing functions and receive the data, variations to those functions can be made while adhering to the general server-client dichotomy and the scope of the disclosed machines, computing systems, and methods.

For example, rather than the computing system 140A sending select data (e.g., a symbol set) to the computing system 140B, such that the computing system 140B can generate and display appropriate images, the computing system 140A can generate the images and send them to the computing system 140B for display. Indeed, it will be appreciated by one of ordinary skill in the art that the "break point" between the server computing system's functions and the client computing system's functions can be varied.

As noted above, in at least some embodiments, a slots game can result in a win if three symbols along a payline/payway match a set of symbols in a pay table. In at least some of those embodiments, the slots game can output the symbols in a symbol-display-portion 191 shown in FIG. 10. The symbol-display-portion 191 includes a column 193, 195, 197 for outputting symbols of a reel 218, 220, 222 shown in FIG. 13. The symbol-display-portion 191 includes nine symbol positions and a payline or payway 199. The symbol-display-portion 182 shown in FIG. 9 can be replaced with the symbol-display-portion 191.

III. Video Slot Game Example a. Registration

The computing system 140 (or the computing system 140A and the computing system 140B) can be provisioned, for example, as one or more virtual slots rooms where slots is the only game available to would-be players, or one where a variety of different games, including arcade games, are offered to the players.

Figure 11:
FIG. 11 is a simplified illustration of a GUI home page for a website, in accordance with example embodiments.

When a player clicks on or navigates to one of a casino websites, she or he can be presented with a "home page" that contains information about the casino and its features. FIG. 11 is a simplified illustration of a home page 200 of a casino website. When, e.g., a workstation logs on to the home page 200 of the website, the workstation can receive a message inviting the player to register with the casino operator and to games hosted by the casino operator's website. The particular layout of the home page and the invitation can vary widely.

In the example of FIG. 11, the home page 200 includes an invitation for a player to register. To proceed in some embodiments, the player need only can click on the user-selectable control 202 and follow the instructions to begin playing a game. In other embodiments, the player is prompted to first click on a registration user-selectable 204, download the client process and register as a player. The player uploads identifying information for registering with the game provider (such as a casino website operator). In at least some embodiments, the player can perform the registration via a first workstation/computing system and select and play the game via a second workstation/computing system.

The registration data for the player can be sufficient to identify the player as an entity that has previously purchased a membership subscription for the casino. The website (by way of the computing system 140, 140A can ask for a player's password or otherwise authenticate the identity of the player. Further, the website (by way of the computing system 140, 140A) can ask for such data such that the player can purchase a membership subscription from the game provider. The player, however, is not required to have, or acquire, the membership subscription to play the game.

After the player downloads the client process and registers with the casino, the player can select a game they wish to play. It is assumed in this example that the player selects to play a 3-reel video slot game or another game described in this description.

b. Game Operation

Figure 12:
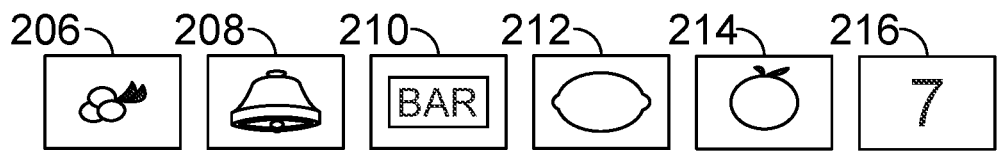
FIG. 12 depicts a set of reel symbols used in a three-reel video slot game, in accordance with example embodiments.
Figure 13:
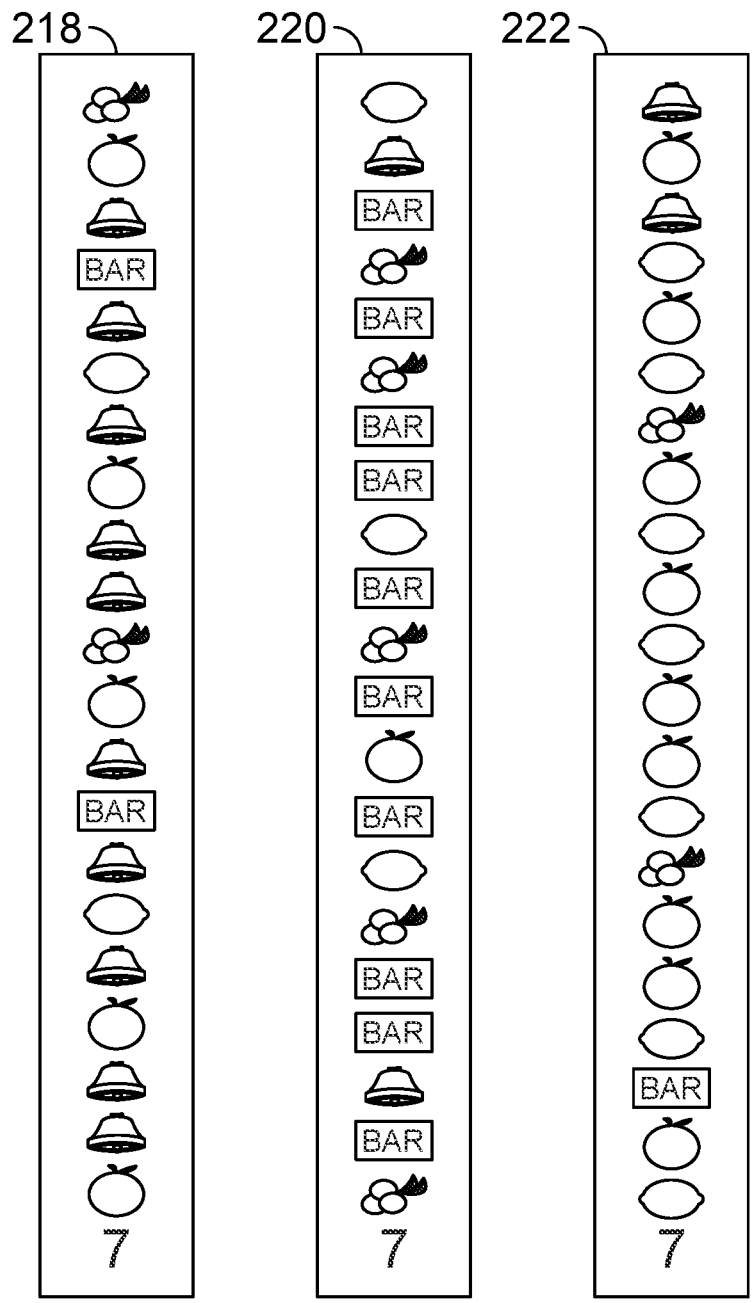
FIG. 13 depicts an arrangement of reel symbols used in a three-reel video slots game, in accordance with example embodiments.
Figure 15:
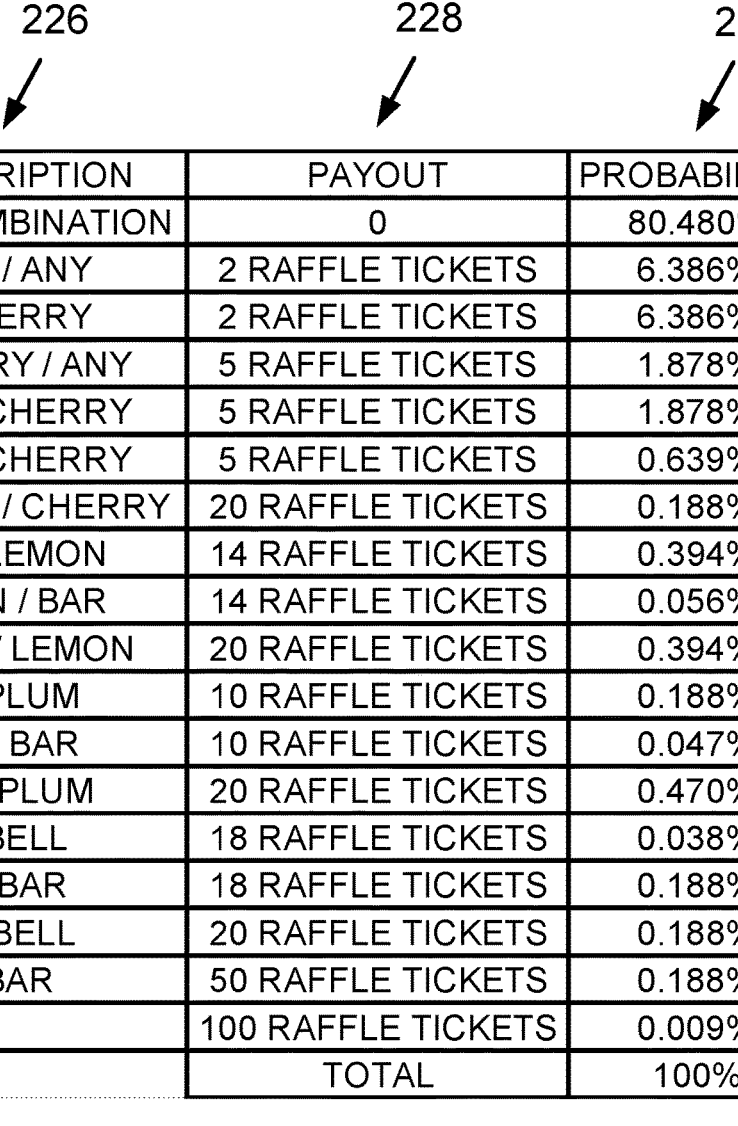
FIG. 15 shows an alternative pay table, in accordance with example embodiments.
Figure 18:
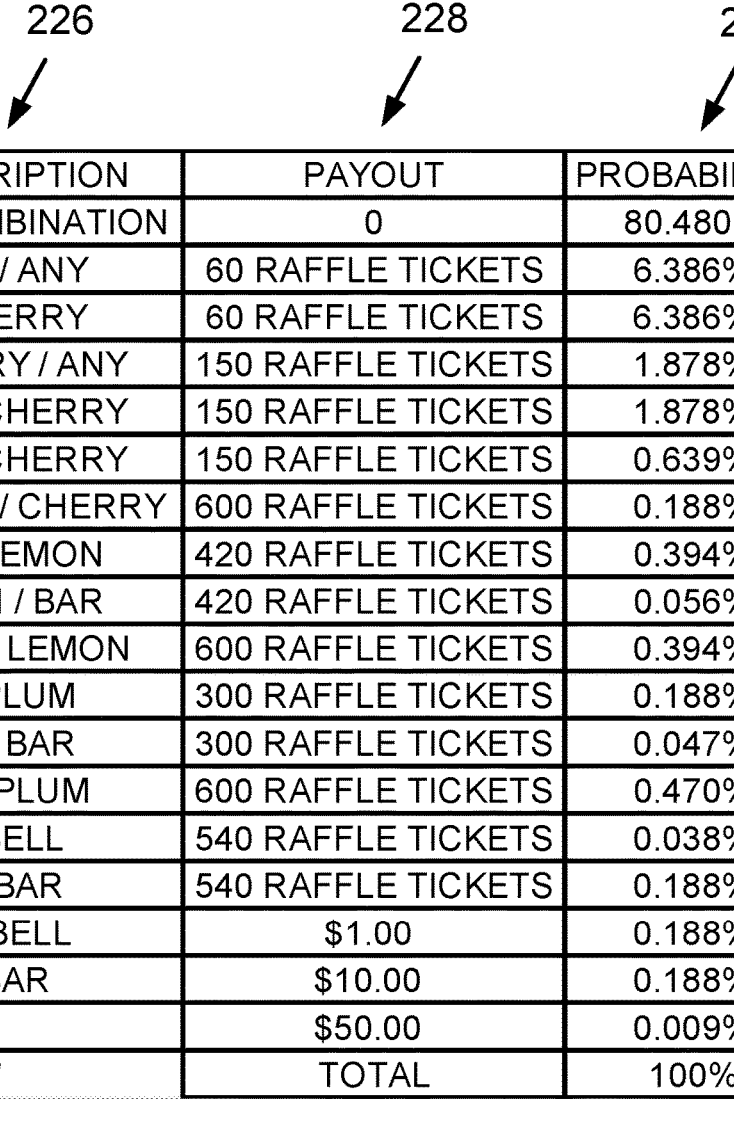
FIG. 18 shows a Gold, Premium Tier pay table, in accordance with example embodiments.
Figure 19:
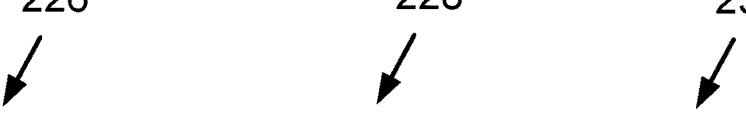
FIG. 19 shows a Black, Premium Tier pay table, in accordance with example embodiments.

An example, aspects of a three-reel video slot game is illustrated in FIG. 12 and FIG. 13. FIG. 12 shows a set of six different reel symbols used in the game, namely cherries ("cherry") 206, a bell 208, a bar 210, a lemon 212, a plum 214, and a seven 216. Each example reel of the video slot game contain 22 reel symbols drawn from the reel symbol set of FIG. 12. This means that there are 10,648 possible outcomes for each turn of the game. Alternatively, a different number of reel symbols per set, different types of reel symbols, a different number of reel symbols per reel, and/or a different number of reels per game can be used.

The arrangement of the symbols on three reels 218, 220, and 222 is illustrated in FIG. 13. During play, the player can initiate the game event video slot game (i.e., execute a turn of the slot game) by means of the user interface 144B. The reels 218, 220, and 222 can spin and come to rest in a randomly chosen position. For example, the rest position of the reels can be determined in the server 104 or the computing system 140A and sent in the form of a datagram to a gaming workstation 110, 112, 114 or the computing system 140B for display. The set of symbols showing the at-rest position of the reels constitutes an "outcome" of the turn, also referred to in this disclosure as an event outcome or game outcome. The player wins if the outcome corresponds to a winning combination in a pay table associated with the game. The award for a winning outcome can be determined by the processor based on a pay table for the particular player and particular game.

In accordance with at least some embodiments, the server 104 or the computing system 140A can communicate the rest positions of the reels 218, 220, 222 by transmitting a tuple of index numbers corresponding to reel positions of the reels 218, 220, 222, e.g., (index value for reel 1, index value for reel 2, index value for reel 3) indicated in Table B. For example, the processor can be configured to use the RNG 162 to select three index numbers within Table B and send a tuple including those index values, for example (7, 12, 18) such that the reel 218, 220, 222 stop on a payline such that symbol 208, 210, 212 are shown on the payline. Transmission of index values across a communication network can be less burdensome on the network than transmitting an animation file showing spinning reels or transmitting file names corresponding to symbols of the symbols 170.

TABLE B

| Reel position | Reel 1 symbol | Reel 2 symbol | Reel 3 symbol |
|---|---|---|---|
| 1 | 206 | 212 | 208 |
| 2 | 214 | 208 | 214 |
| 3 | 208 | 210 | 208 |
| 4 | 210 | 206 | 214 |
| 5 | 208 | 210 | 212 |
| 6 | 212 | 206 | 214 |
| 7 | 208 | 210 | 206 |
| 8 | 214 | 210 | 214 |
| 9 | 208 | 212 | 212 |
| 10 | 208 | 210 | 214 |
| 11 | 206 | 206 | 212 |
| 12 | 214 | 210 | 214 |
| 13 | 208 | 214 | 214 |
| 14 | 210 | 210 | 212 |
| 15 | 208 | 212 | 206 |
| 16 | 212 | 206 | 214 |
| 17 | 208 | 210 | 214 |
| 18 | 214 | 210 | 212 |
| 19 | 208 | 208 | 210 |
| 20 | 208 | 210 | 214 |
| 21 | 214 | 206 | 212 |
| 22 | 216 | 216 | 216 |

Next, FIG. 14 shows a pay table 224 for a three-reel slot game with a wager is illustrated in FIG. 14. Each entry in the pay table includes an outcome description 226 and a corresponding, payout 228 awarded to the player per wager credit, and the probability 230 of any particular outcome event for a turn of the game. Generally, however, a non-gambling game using the pay table of FIG. 14, providing monetary payouts to players with no return to game provider, may not always be a sustainable endeavour.

IV. Premium Tier Membership Subscriptions

In an example embodiment, the game is a video slot game which has a conventional pay table, such as the pay table 224 illustrated in FIG. 14. In at least some alternative embodiments, all of the payouts are so-called "raffle tickets," as reflected in the pay table 232 illustrated in FIG. 15. In yet another alternative, example embodiment, the top payout(s) is a monetary prize while the remaining payouts are so-called "raffle tickets." Examples of a payout table used in this embodiment is shown in FIG. 16 to FIG. 19.

Based on a pay table including raffle ticket prizes, the gaming system 100 can periodically (such as, for example, every 15 minutes, or every hour, or once a day) conduct a raffle drawing. The drawing can be performed, for example, by the computing system 140 or by a separate computer or by a hand, where a winning ticket is manually pulled from a container of physical tickets. The raffle tickets won by players since the last drawing are eligible to win a prize The prize is awarded to the one or more players who have the raffle ticket(s) selected. The prizes can include, for example:
a monetary award,
a physical prize,
another item of monetary value,
a pass to play, at no cost, another arcade game at the casino hosting the video slot game, or
a pass to play another video slot game, at no cost, at the casino hosting the video slot game.

The raffle tickets provided upon the detection of a winning game are considered Restricted Award because they have no redeemable value. Thus, for example, a raffle ticket can be only useful for entry into a single future raffle (e.g., a particular, future raffle held by the gaming system 100 and/or a game provider).

In example embodiments, the gaming system 100 and/or the game provider of the video slot game can offer players a membership subscription for purchase. Without a membership subscription, the player and her or his registration information will denote a Base Tier. Upon purchasing a membership subscription, however, the player will have a Premium Tier status, which can be reflected in her or his registration data or otherwise stored in a memory. Upon determining that the player's registration data reflects a premium tier, the computing device can provide the game to the player with an enhanced mode of operation. Upon determining that the player's registration data reflects a base tier, the computing device can provide the game to the player with a base mode of operation. The mode of operation reflects the payout determination or the attributes of game play or both.

A player that does not acquire membership in the relevant action can still play the games, at no cost and whenever, and for as long as, the player wishes to do so.

The game provider is able to quantify the expected cost of offering, e.g., a video slot game for play. For example, a processor can determine the expected cost can be based on variables such as a definable time, (e.g., six seconds, per spin of the reels) plus the cost of a raffle prize at predefined intervals, plus the cost of any monetary awards allowed. Accordingly, the provider can determine, in advance, the average cost of providing the game for a set period of time (e.g., a day). The provider can thus, set the cost of the premium membership may be set at a level that covers the cost of offering the non-gaming video slot game.

In an example embodiment, however, a player can purchase, one of four different levels of membership subscription: Bronze Tier level, Silver Tier level, Gold Tier level, and Black Tier level. Each of these different membership levels is a premium tier, but each has different benefits. In particular, for a Bronze Tier level, the computing system 140 will perform the game at a first mode of operation; for a Silver Tier level, the computing system 140 will perform the game at a second mode of operation; for a Gold Tier level, the computing system 140 will perform the game at a third mode of operation; and for a Black Tier level, the computing system 140 will perform the game at a fourth mode of operation. As a whole, the first, second, third, and fourth modes of operations function differently from one another, although some functions of two or more of those modes of operation can be identical. The first, second, third, and fourth modes of operation can be different than a mode of operation corresponding to a Base Tier level. A person having ordinary skill in the art will understand that labels besides Bronze, Silver, Gold, and Black can be associated with the different premium tiers discussed above. The skilled person will also understand that a quantity of premium tier levels other than four premium tier levels can be used for a game provided by the gaming system 100.

In an example embodiment, different tier levels reflect different pay tables. For example, the table 168 can include a pay table 232 shown in FIG. 15 for a base tier, a pay table 234 shown in FIG. 16 for a Bronze premium tier, a pay table 236 shown in FIG. 17 for a Silver premium tier, a pay table 238 shown in FIG. 18 for a Gold premium tier, and a pay table 240 shown in FIG. 19 for a Black premium tier. In at least some embodiments, the different tiers are defined according to a hierarchy, such a hierarchy in which the Silver Tier is a higher than the Bronze Tier, the Gold Tier is higher than the Silver Tier, and the Black Tier is higher than the Gold Tier.

As indicated by the example pay tables, the higher the tier, generally, the larger the raffle ticket prizes are that are awarded to winners. Of course, the pay tables shown are only example. The pay table of FIG. 16 can be used as a base pay table, with Bronze premium pay table further enhanced so as to differentiate it from the Base Tier pay table.

As shown in the pay tables, additional, monetary prizes are available to be won by with higher tiers. For example, only the top payout is a monetary prize for Bronze members; the top two payouts are monetary prizes for Silver members; the top three payouts are monetary prizes for Gold members; and the top four payout are monetary prizes for Black tier memberships.

As indicated above, a raffle ticket payout is a restricted payout: it can only be used in a raffle hosted by the game provider. Any prize or other award for the winner of the raffle is determined the game provider. An unrestricted award, as can be provided to premium tier members, can be used freely by the player: unrestricted awards include money or vouchers redeemable for money.

In yet another, alternative, example embodiment, the payout tickets for Gold and Black Tier members are for a drawing separate from the raffle drawing for Base, Bronze, and Silver Tier memberships. The drawing for the Gold and Black drawing has more desirable prizes and/or larger monetary awards than those provided to the winners of the Base, Bronze, and Silver Tier raffles.

In still another, alternative, example embodiment, the pay table for one or more of the premium tier memberships includes payouts of guaranteed prize tokens. Accordingly, upon accumulating sufficient guaranteed prize tokens after one or more turns of the game, a player having a premium membership will be awarded a prize. Again, the prize can be a monetary award or another item of value.

In still another, alternative, example embodiment, the pay table for one or more of the premium tier memberships includes a payout of passes for the player to play, at no cost, various arcade games of the casino providing the video slot games. Alternatively, the pay table for one or more of the premium tier memberships includes payouts of passes for the player to play, at no cost, various other video slot games of the casino.

In still other example embodiments, the mode of operation of the game for premium tiers enhances the play of the game, in addition to, or instead of, enhancing the pay tables. For example, as noted above, the computing system 140 can display visual advertisements and/or play audio advertisements before, during and/or after the operation of a game. In example embodiments, no advertisements are presented to, for example, players having Black Tier memberships. Fewer or less intrusive advertisements can be provided to player having other premium tier memberships.

In another embodiments, a speed of play of the game (e.g., a video slot game) is altered (e.g., increased) for one or more tiers of memberships. In another example embodiment, players for one or more tiers of memberships are allowed to select the speed of the game.

In still other embodiments, higher quality video displays and/or audio presentations are provided to one or more premium tier member during the operation of the games. In other embodiments, one or more premium tiers are provided with means to a videoconference or otherwise confer with other individuals during the operation of a game.

As before, because there is a definable time for the spin of the reels, and the cost of a raffle prizes, plus the cost of monetary awards allowed at each tier level are known, the game provider can determine, in advance, the average cost of providing the game for a set period of time. Accordingly, the game provider can set the cost of the various premium membership tiers so as cover the cost of offering the game at the different tier levels.

According to one aspect of the example embodiments, the game play does not involve the making of a wager (i.e., putting money or other payment of consideration in order to place a wager on the outcome of an uncertain event). Accordingly, a player is not participating in an activity that can be consider illegal gambling in some jurisdictions.

According to another aspect of example embodiments, no consideration is required from a player: play of the game is free for everyone. As a consequence, there is no requirement for an Alternative Means of Entry for the game in jurisdictions where only free-play games are allowed. Further, without the requirement of an AMOE in such jurisdictions, there is no requirement for everyone to win the same prizes, and the multi-tiered membership subscription described in this disclosure remains proper.

V. Example Operation

FIG. 20 is a flow chart 250 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon.

Block 252 includes receiving registration data for an individual player. Receiving the registration data can occur at a computing system, such as the computing system 140, 140A, 140B, the server 104, or the gaming workstation 110, 112, 114. As an example, the registration data can be entered via the user interface 144 and transmitting from one computing system to another computing system (e.g., transmitting the registration data from the computing system 140B to the computing system 140A). A computing system that receives the registration data can store the registration data in a memory, such as the memory 158, 158A, 158B. In at least some embodiments, receiving the registration data can include receiving the registration data to register the individual player with the gaming system 100. Additionally or alternatively, receiving the registration data can include receiving the registration data to verify the individual player is registered with the gaming system 100. Examples of the registration data are discussed elsewhere in this description.

The function(s) of block 252 can be performed by a processor (e.g., one or more hardware processors) configured by machine-readable instructions including a module that is the same as or similar to the receive module 81, in accordance with the example embodiments. The function(s) of block 252 can include one or more of the functions described with respect to the receive module 81. As an example, the processor can receive registration data for an individual player, as discussed in connection with the receive module 81 shown in FIG. 7.

Next, block 254 includes confirming the validity of the registration data. As an example, a computing system that confirms the registration data is valid by seeking to match the name, personal information, and password provided by the player with the corresponding information held in memory. The function(s) of block 254 can be performed by a processor (e.g., one or more hardware processors) configured by machine-readable instructions including a module that is the same as or similar to the confirm module 82, in accordance with the example embodiments. The function(s) of block 272 can include one or more of the functions described with respect to the confirm module 82. As an example, the processor can confirm the validity of the registration data, as discussed in connection with the confirm module 82 shown in FIG. 7.

Next, block 256 includes determining whether registration data corresponds to an individual player (e.g., the first, second, third, or fourth player discussed in this description) at a baser tier or a premium tier. If the determination indicates the registration data corresponds to a premium tier, a processor further includes determining a tier status of the premium tier (e.g., Bronze, Silver, Gold or Black) Such a determination can include an inquiry whether membership subscription payments are current, with the player being denied premium tier benefits if her or his account payments are overdue. The computing system can also accept registration data from a Base Tier player. The function(s) of block 256 can be performed by a processor (e.g., one or more hardware processors) configured by machine-readable instructions including a module that is the same as or similar to the determine module 83, in accordance with the example embodiments. The function(s) of block 256 can include one or more of the functions described with respect to the determine module 83. As an example, the processor can determine whether registration data corresponds to an individual player at a baser tier or a premium tier, as discussed in connection with the determine module 83 shown in FIG. 7.

Next, block 258 includes receiving a start input from the individual player. As an example receiving the start input can include the individual player selecting a user-selectable control (e.g., the USC 192 shown in FIG. 9) corresponding to the start input at the computing system 140B and transmitting a communication including the start input from the computing system 140A via the communication network 161, or from the gaming workstation 110, 112, 114 to the server 104. The function(s) of block 258 can be performed by a processor (e.g., one or more hardware processors) configured by machine-readable instructions including a module that is the same as or similar to the receive module 81, in accordance with the example embodiments. The function(s) of block 258 can include one or more of the functions described with respect to the receive module 81. As an example, the processor can receive a start input from the individual player, as discussed in connection with the receive module 81 shown in FIG. 7.

Next, block 260 includes initiating game operation according to an applicable tier status (e.g., a base, bronze, silver, gold, or black tier status corresponding to the individual player). As an example, initiating the game operation can include using an RNG (e.g., the RNG 162, 162A, 162B to select one or more numbers corresponding to the game, such as a number corresponding to a set of symbols to output in a symbol-display-portion, a number on a roulette wheel, or a particular position of a prize wheel. In at least some embodiments, a mode of the game can be adjusted according to the applicable tier status. As an example, adjusting the mode of the game can include selecting a set of reels or reels symbols applicable to the tier status or selecting a set of prizes on a prize wheel. The function(s) of block 260 can be performed by a processor (e.g., one or more hardware processors) configured by machine-readable instructions including a module that is the same as or similar to the initiate game module 84, in accordance with the example embodiments. The function(s) of block 260 can include one or more of the functions described with respect to the initiate game module 84. As an example, the processor can initiate game operation according to an applicable tier status, as discussed in connection with the initiate game module 84 shown in FIG. 7.

Next, block 262 includes detecting a trigger event, wherein an outcome of the event changes from uncertain to certain. As an example, the event can be uncertain while the reels of a video slot game, a roulette wheel of a video roulette game, or a prize wheel of a prize wheel game is/are spinning and the event can be certain once the reels or wheel stops spinning. The function(s) of block 262 can be performed by a processor (e.g., one or more hardware processors) configured by machine-readable instructions including a module that is the same as or similar to the detect trigger module 85, in accordance with the example embodiments. The function(s) of block 262 can include one or more of the functions described with respect to the detect trigger module 85. As an example, the processor can detect a trigger event, wherein an outcome of the event changes from uncertain to certain, as discussed in connection with the detect trigger module 85 shown in FIG. 7.

Next, block 264 includes making a payout determination by reference to a payout table (e.g., a base, bronze, silver, gold, or black payout table or the pay table 232, 234, 236, 238, 240). As an example, the computing system 140, 140A, 140B can determine whether any payout is due to the player as a result of the event outcome (game result). For instance, if the applicable payout table is the payout table 236 of FIG. 17 and outcome includes the following sequence of symbols: the plum 214, the plum 214, and the bar 210, by referring to the payout table 236, the computing system can determine the payout is 200 raffle tickets. The function(s) of block 264 can be performed by a processor (e.g., one or more hardware processors) configured by machine-readable instructions including a module that is the same as or similar to the payout module 86, in accordance with the example embodiments. The function(s) of block 264 can include one or more of the functions described with respect to the payout module 86. As an example, the processor can make a payout determination by reference to a payout table, as discussed in connection with the payout module 86 shown in FIG. 7.

Next, block 266 includes transmitting data on any payout to a payout device. As an example, the payout device can include the payout device 160, 160A, 160B. The payout device can transfer funds (e.g., sweeps coins, raffle tickets and/or currency to a player). A processor can update the payout amount indicator 186 based on the payout determined by reference to a payout table and/or the symbols landing on a payline or payway. A processor can update the payout amount indicator 186 based on the payout indicated on a prize wheel. A processor can update the payout amount indicator 186 based on the payout determined by reference to a payout table, a number on a roulette wheel selected by a user, and a number on a roulette wheel selected via a spin of the roulette wheel. The processor can update the credit balance indicator 188 and/or the player account facility 124, 126 based on the payout. The function(s) of block 266 can be performed by a processor (e.g., one or more hardware processors) configured by machine-readable instructions including a module that is the same as or similar to the transmit module 87, in accordance with the example embodiments. The function(s) of block 266 can include one or more of the functions described with respect to the transmit module 87. As an example, the processor can transmit data on any payout to a payout device, as discussed in connection with the transmit module 87 shown in FIG. 7.

Next, FIG. 21 is a flow chart 270 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon. As an example, the functions of the flow chart 270 can be carried out for a player to register with a casino operator to obtain premium tier status. One or more functions shown in the flow chart 270 can be carried out in combination with one or more functions of the flow chart 250 shown in FIG. 20.

Block 272 includes receiving registration data for an individual player. As an example, a computing system can receive information regarding the individual player, such as a name, an address, an account information (e.g., a payment card identifier to pay for a premium tier subscription), a password, and/or a user name. The computing system can prompt the individual player to provide any information required for registering the player. The function(s) of block 272 can be performed by a processor (e.g., one or more hardware processors) configured by machine-readable instructions including a module that is the same as or similar to the receive module 81, in accordance with the example embodiments. The function(s) of block 272 can include one or more of the functions described with respect to the receive module 81. As an example, the processor can receive registration data for an individual player, as discussed in connection with the receive module 81 shown in FIG. 7.

Next, block 274 includes providing a membership subscription for a base, bronze, silver, gold or black tier status. The provision of the membership can be based on a membership request, and if applicable a payment corresponding to the requested membership. A person having ordinary skill in the art will understand the various membership subscriptions can be identified via different identifiers and a different quantity of memberships can be available for a subscription. The function(s) of block 274 can be performed by a processor (e.g., one or more hardware processors) configured by machine-readable instructions including a module that is the same as or similar to the provide membership module 91, in accordance with the example embodiments. The function(s) of block 274 can include one or more of the functions described with respect to the provide membership module 91. As an example, the processor can provide a membership subscription for a base, bronze, silver, gold or black tier status, as discussed in connection with the provide membership module 91 shown in FIG. 7.

Next, block 276 includes storing, in a memory (e.g., the memory 158, 158A, 158B), a tier status associated with the individual player. As an example, the tier status can indicate the tier status for the membership subscription provided at block 274. The function(s) of block 276 can be performed by a processor (e.g., one or more hardware processors) configured by machine-readable instructions including a module that is the same as or similar to the store module 90, in accordance with the example embodiments. The function(s) of block 272 can include one or more of the functions described with respect to the store module 90. As an example, the processor can store, with a memory, a tier status associated with an individual player, as discussed in connection with the store module 90 shown in FIG. 7.

Next, FIG. 22 is a flow chart 280 showing functions of an example embodiment that can be carried out using a computing system, such as the gaming system 100 of FIG. 1, the computing system 140 of FIG. 4, the computing system 140A of FIG. 5, and/or the computing system 140B of FIG. 5. For example, a server device can conduct a game with a client device. The server device can be, for example, a server hosted and/or controlled by an online casino operator (e.g., the server), and the client device can be, for example, a personal computer, laptop computer, tablet computer, or cell phone that allows a player to access the server device and the game thereon. As an example, the functions of the flow chart 280 can be carried out for a gaming system and/or a game provider to conduct a raffle. One or more functions shown in the flow chart 280 can be carried out in combination with one or more functions of the flow chart 250 shown in FIG. 20 and/or one or more functions of the flow chart 270 shown in FIG. 21.

Block 282 includes receiving raffle ticket payout information corresponding to a registered player and his or her tier status. As an example, the computing system can receive data identifying every raffle ticket won by any player since the last raffle. The function(s) of block 282 can be performed by a processor (e.g., one or more hardware processors) configured by machine-readable instructions including a module that is the same as or similar to the receive module 81, in accordance with the example embodiments. The function(s) of block 282 can include one or more of the functions described with respect to the receive module 81. As an example, the processor can receive raffle ticket payout information corresponding to a registered player and his or her tier status, as discussed in connection with the receive module 81 shown in FIG. 7.

Next, block 284 includes awaiting a predetermined interval. As indicated above, the interval can be a predetermined period of time, such as 15 minutes, an hour, or a day. Alternatively, the internal can be based on a variable factor. For example, a raffle can be held promptly after a specific number of raffle tickets have been won by players. The function(s) of block 284 can be performed by a processor (e.g., one or more hardware processors) configured by machine-readable instructions including a module that is the same as or similar to the await module 88, in accordance with the example embodiments. The function(s) of block 284 can include one or more of the functions described with respect to the await module 88. As an example, the processor can await a predetermined interval, as discussed in connection with the await module 88 shown in FIG. 7.

Next, block 286 includes conducting a raffle. Where every ticket has been assigned a unique number, the raffle can involve entail choosing, at random, one ticket out all the tickets won since the last raffle. Alternatively, if raffle ticket number are randomly assigned, the raffle can entail choosing a number at random and checking to see whether any raffle ticket number corresponds to the randomly chosen number in the raffle. If one or more such tickets are found, the computing system designates that ticket or those tickets as winning. The function(s) of block 286 can be performed by a processor (e.g., one or more hardware processors) configured by machine-readable instructions including a module that is the same as or similar to the conduct raffle module 89, in accordance with the example embodiments. The function(s) of block 286 can include one or more of the functions described with respect to the conduct raffle module 89. As an example, the processor can conduct a raffle, as discussed in connection with the conduct raffle module 89 shown in FIG. 7.

Next, block 288 includes transmitting data on any raffle payout to a payout device. As discussed, a payout can be transmitted to a payout device in use by a player holding (physically or virtually) a raffle-winning ticket. The function(s) of block 288 can be performed by a processor (e.g., one or more hardware processors) configured by machine-readable instructions including a module that is the same as or similar to the transmit module 87, in accordance with the example embodiments. The function(s) of block 288 can include one or more of the functions described with respect to the transmit module 87. As an example, the processor can transmit data on any raffle payout to a payout device, as discussed in connection with the transmit module 87 shown in FIG. 7.

VI. Conclusions

The functions described throughout this can be performed in an order different than an order of functions (if any) described in in this disclosure or shown in the drawings. Additionally, embodiments in the form of a method can include one or more of the functions described in this disclosure or shown in the drawings.

While examples have been described in terms of select embodiments, alterations and permutations of these embodiments will be apparent to those of ordinary skill in the art. Other changes, substitutions, and alterations are also possible without departing from the disclosed machines, computing systems, and methods in their broader aspects as set forth in the claims below.

Finally, one or more embodiments described above can relate to one or more of the following enumerated example embodiments (EEE).

EEE A1 is a method of providing a non-gambling game comprising: receiving, at a computing system, registration data; confirming, by the computing system, the registration data and determining whether the registration data corresponds to a base or premium tier; receiving, at the computing system, a start input; in response to receiving the start input, and without any requirement of payment for a bet, the computing system performing a game operation resulting in a game outcome; detecting, by the computing system, the game outcome and responsively making a payout determination, wherein the computing system performs a base mode of game operation upon determining the registration data corresponds to a base tier and an enhanced mode of game operation upon determining the registration data corresponds to a premium tier membership; and transmitting, by the computing system, data on any payout to a payout device.

EEE A2 is the method of EEE A1, wherein the payout determination is made in accordance with a pay table correlating possible game outcomes with payouts, and wherein the base mode of game operation utilizes a base pay table in which all game outcomes are correlated to a raffle ticket payout.

EEE A3 is the method of any one of EEE A1 to A2, wherein the enhanced mode of game operation utilizes a premium pay table in which at least one game outcome is correlated to an unrestricted payout.

EEE A4 is the method of EEE A3, wherein the premium pay table correlates a majority of game outcomes to a raffle ticket payout and at least two game outcomes to an unrestricted payout.

EEE A5 is the method of any one of EEE A1 to A4, further comprising: generating, by the computing system, an advertisement on a display during the base mode of game operation but not generating an advertisement during the enhanced mode of game operation.

EEE A6 is the method of any one of EEE A1 to A5, wherein the non-gambling game includes a video slot game.

EEE A7 is the method of EEE A6, wherein the video slot game includes three, four, or five reels of symbols.

EEE A8 is the method of any one of EEE A1 to A7, wherein the raffle ticket payout is output for a first raffle conducted after the computing system determines a particular amount of time has passed since the computing system conducted a previous raffle.

EEE A9 is the method of any one of EEE A1 to A7, wherein the raffle ticket payout is output for a first raffle conducted after the computing system determines a threshold quantity of raffle tickets have been awarded since the computing system conducted a previous raffle.

EEE A10 is the method of any one of EEE A8 to A9, wherein conducting the first raffle includes conducting the first raffle based on raffle tickets awarded to any player subscribing to the base tier and raffle tickets awarded to any player subscribing to the premium tier, and wherein the method further comprises conducting a second chance raffle based on the raffle tickets awarded to any player subscribing to the premium tier.

EEE A11 is the method of any one of EEE A1 to A10, wherein the game outcomes correlated to the raffle ticket payout are game outcomes based on video slot games performed for a single gaming workstation.

EEE A12 is the method of any one of EEE A1 to A10, wherein the game outcomes correlated to the raffle ticket payout are game outcomes based on video slot games performed for multiple gaming workstations.

EEE A13 is the method of any one or EEE A1 to A5, wherein the non-gambling game includes a roulette game.

EEE A14 is the method of EEE A13, further comprising: receiving a selection of one or more numbers on a roulette wheel; and outputting an animation showing the roulette wheel spinning and stopping with a particular position of the roulette wheel as a spin outcome.

EEE A15 is the method of EEE A14, further comprising awarding a quantity of raffle tickets if a number corresponding to the particular position of the roulette wheel matches the one or more selected numbers.

EEE A16 is the method of any one or EEE A1 to A5, wherein the non-gambling game includes a prize wheel game.

EEE A17 is the method of EEE A16, further comprising: outputting an animation showing a prize wheel spinning and stopping with a particular position of the prize wheel as a spin outcome.

EEE A18 is the method of EEE A17, wherein the particular position of the prize wheel indicates a quantity of raffle tickets to be awarded.

EEE A19 is the method of EEE A17, wherein the particular position of the prize wheel indicates a quantity of raffle tickets to be subtracted from a quantity of previously awarded raffle tickets.

EEE A20 is a computing system comprising at least one processor and a non-transitory, computer-readable memory storing executable instructions, wherein execution of the executable instructions by the at least one processor causes the computing system to perform the method of any one of EEE A1 to A19.

EEE A21 is a non-transitory, computer-readable memory having stored therein instructions executable by at least one processor to cause a computing system to perform the method of any one of EEE A1 to A19.

EEE A22 is a computing system comprising: at least one processor; and a non-transitory, computer-readable memory having stored thereon program instructions that, when executed by the at least one processor, cause the computing system to perform operations comprising: receiving, by the at least one processor, registration data; confirming, by the at least one processor, the registration data and determining whether the registration data corresponds to a base or premium tier; receiving, at the at least one processor, a start input; in response to receiving the start input, and without any requirement of payment for a wager, the at least one processor performing a game operation resulting in a game outcome; detecting, by the at least one processor, the game outcome and responsively making a payout determination, wherein the at least one processor performs a base mode of game operation upon determining the registration data corresponds to the base tier or an enhanced mode of game operation upon determining the registration data corresponds to the premium tier; and transmitting, by the at least one processor, data on any payout to a payout device.

EEE A23 is the computing system of EEE A22, wherein execution of the program instructions by the at least one processor causes the computing system to perform the method of any one of EEE A2 to A19.

EEE B1 is a method of providing a non-gambling video slot game comprising: receiving, at a computing system, registration data; confirming, by the computing system, the registration data and determining whether the registration data corresponds to a base or premium tier; receiving, at the computing system, a start input; in response receiving the start input, and without any requirement of payment for a bet, the computing system generating a pattern of symbols to performing a video slot game operation resulting in a game outcome; determining, by the computing system, the game outcome and responsively making a payout determination, wherein: upon determining the registration data corresponds to a base tier, the computing system performs the payout determination in accordance with a base pay table, the base pay table correlating a plurality of game outcomes with a raffle ticket payout, and upon determining the registration data corresponds to the premium tier, the computing system performs the payout determination in accordance with a premium pay table, the premium pay table correlating at least one game outcome with a raffle ticket payout and at least one game outcome with an unrestricted payout; and transmitting, by the computing system, data on any payout to a payout device.

EEE B2 is the method of EEE B1, further comprising: periodically conducting a raffle in which a raffle ticket is selected; and transmitting, by the computing system, data on the selected raffle ticket to a payout device.

EEE B3 is the method of any one of EEE B2, wherein conducting the raffle occurs after the computing system determines a particular amount of time has passed since the computing system conducted a previous raffle.

EEE B4 is the method of any one of EEE B2, wherein conducting the raffle occurs after the computing system determines a threshold quantity of raffle tickets have been awarded since the computing system conducted a previous raffle.

EEE B5 is the method of any one of EEE B2 to B4, wherein conducting the raffle includes conducting a first raffle based on raffle tickets awarded to any player subscribing to the base tier and raffle tickets awarded to any player subscribing to the premium tier, and wherein the method further comprises conducting a second chance raffle based on the raffle tickets awarded to any player subscribing to the premium tier.

EEE B6 is the method of any one of EEE B1 to B2, wherein both the base and premium pay tables correlate a plurality of potential game outcomes to a raffle ticket payout, and wherein, for at least one potential game outcome, a raffle ticket payout of the premium pay table is larger than a raffle ticket payout of the base pay table.

EEE B7 is the method of EEE B6, wherein, for the at least one potential game outcome, the raffle ticket payout of the premium pay table is larger than all raffle ticket payouts of the base pay table.

EEE B8 is the method of any one of EEE B1 to B7, wherein the premium tier includes at least first and second premium tier levels, and wherein: upon determining the registration data corresponds to the first premium tier level, the computing system makes the payout determination in accordance with a first premium pay table; upon determining the registration data corresponds to the second premium tier level, the computing system makes the payout determination in accordance with a second premium pay table; and the first and second premium pay tables each correlate a plurality of game outcomes with a raffle ticket payout and, for at least one potential game outcome, the second premium pay table correlates a larger raffle ticket payout than the first premium pay table.

EEE B9 is the method of EEE B8, wherein: the first premium pay table correlates at least one possible game outcome to an unrestricted payout; and the second premium pay table correlates a larger number of game outcomes to an unrestricted payout than the first premium pay table.

EEE B10 is the method of EEE B8, wherein, for the at least one potential game outcome, the second premium pay table correlates a larger raffle ticket payout than all raffle ticket payouts of the first premium pay table.

EEE B11 is the method of any one of EEE B1 to B7, wherein the premium tier includes at least first, second, and third premium tier levels, and wherein: upon determining the registration data corresponds to the first premium tier level, the computing system makes the payout determination in accordance with a first premium pay table, upon determining the registration data corresponds to the second premium tier level, the computing system makes the payout determination in accordance with a second premium pay table, upon determining the registration data corresponds to the third premium tier level, the computing system makes the payout determination in accordance with a third premium pay table, and the first, second, and third premium pay tables each correlate a plurality of game outcomes to a raffle ticket payout and, for least one game outcome, the second premium pay table correlates to a larger raffle ticket payout than the first premium pay table, and for at least one game outcome, the third premium pay table correlates to a larger raffle ticket payout than the second premium pay table.

EEE B12 is the method of EEE B11, wherein: the first premium pay table correlates at least one possible game outcome to an unrestricted payout, the second premium pay table correlates a larger number of possible game outcomes to an unrestricted payout than the first premium pay table, and the third premium pay table correlates a larger number of possible game outcomes to an unrestricted payout than the second premium pay table.

EEE B13 is the method of any one of EEE B1 to B12, wherein: upon determining the registration data corresponds to a base tier, the computing system performs the video slot game operation at a first rate of play, and upon determining the registration data corresponds to a premium tier, the computing system performs the video slot game operation at a second, faster rate of play.

EEE B14 is the method of any one of EEE B1 to B13, wherein: upon determining the registration data corresponds to a base tier, the computing system provides a graphical display and sound at a first quality level during the video slot game operation, and upon determining the registration data corresponds to a premium tier, the computing system provides a graphical display and sound at a second, higher quality level.

EEE B15 is the method of any one of EEE B1 to B7, wherein, the premium tier includes at least first and second premium tier levels, wherein: upon determining the registration data corresponds to the first premium tier level, the computing system makes the payout determination in accordance with a first premium pay table, upon determining the registration data corresponds to the second premium tier level, the computing system makes the payout determination in accordance with a second premium pay table, and both the base and first premium pay tables correlate a plurality of potential game outcomes to a raffle ticket payout, and wherein: the first premium pay table correlates a plurality of game outcomes to a larger raffle ticket payout than the base pay table, and the second premium pay table correlates a plurality of potential game outcomes to a drawing ticket payout, the drawing ticket payout being different than the raffle ticket payout, and wherein the method further comprises: periodically conducting a drawing, separate from the raffle, in which a drawing ticket is selected; and transmitting, by the computing system, data on the drawing ticket selected to a payout device.

EEE B16 is the method of any one of EEE B1 to B7, wherein the premium tier includes at least first and second premium tier levels, wherein: upon determining the registration data corresponds to the first premium tier level, the computing system makes the payout determination in accordance with a first premium pay table, and upon determining the registration data corresponds to the second premium tier level, the computing system makes the payout determination in accordance with a second premium pay table, and wherein: the second premium pay table correlates a plurality of game outcomes to tokens, and a predetermined number of tokens accumulated over one or more gaming operations correlate to an unrestricted payout.

EEE B17 is the method of any one of EEE B1 to B16, wherein a premium pay table correlates at least one game outcome to a pass for playing a different, arcade game at no cost.

EEE B18 is the method of any one of EEE B1 to B17, wherein a premium pay table correlates at least one potential game outcome to a pass for playing a different, video slot game at no cost.

EEE B19 is the method of any one of EEE B1 to B18, wherein the video slot game includes three, four, or five reels of symbols.

EEE B20 is a computing system comprising at least one processor and a non-transitory, computer-readable memory storing executable instructions, wherein execution of the executable instructions by the at least one processor causes the computing system to perform the method of any one of EEE B1 to B19.

EEE B21 is a non-transitory, computer-readable memory having stored therein instructions executable by at least one processor to cause a computing system to perform the method of any one of EEE B1 to B19.

EEE B22 is a computing system comprising: at least one processor; and a non-transitory, computer-readable memory having stored thereon program instructions that, when executed by the at least one processor, cause the computing system to perform operations comprising: receiving, at a computing system, registration data; confirming, by the computing system, the registration data and determining whether the registration data corresponds to a base or premium tier; receiving, at the computing system, a start input; in response receiving the start input, and without any requirement of payment for a bet, the computing system generating a pattern of symbols to performing a video slot game operation resulting in a game outcome; determining, by the computing system, the game outcome and responsively making a payout determination, wherein: upon determining the registration data corresponds to a base tier, the computing system performs the payout determination in accordance with a base pay table, the base pay table correlating a plurality of game outcomes with a raffle ticket payout, and upon determining the registration data corresponds to the premium tier, the computing system performs the payout determination in accordance with a premium pay table, the premium pay table correlating at least one game outcome with a raffle ticket payout and at least one game outcome with an unrestricted payout; and transmitting, by the computing system, data on any payout to a payout device.

EEE B23 is the computing system of EEE B22, wherein execution of the program instructions by the at least one processor causes the computing system to perform the method of any one of EEE B2 to B19.

I claim:

1. A method of providing a non-gambling game comprising:
   receiving, at a computing system, registration data;
   confirming, by the computing system, the registration data and determining whether the registration data corresponds to a base tier or a premium tier;
   receiving, at the computing system, a start input;
   in response to receiving the start input, and without any requirement of payment for a wager, the computing system performing a game operation resulting in a game outcome;
   detecting, by the computing system, the game outcome and responsively making a payout determination, wherein the computing system performs a base mode of game operation upon determining the registration data corresponds to the base tier or an enhanced mode of game operation upon determining the registration data corresponds to the premium tier; and
   transmitting, by the computing system, data on any payout to a payout device.

2. The method of claim 1, wherein the payout determination is made in accordance with a pay table correlating possible game outcomes with payouts, and wherein the base mode of game operation utilizes a base pay table in which all game outcomes are correlated to a raffle ticket payout.

3. The method of claim 2, wherein the enhanced mode of game operation utilizes a premium pay table in which at least one game outcome is correlated to an unrestricted payout.

4. The method of claim 3, wherein the premium pay table correlates a majority of game outcomes to a raffle ticket payout and at least two game outcomes to an unrestricted payout.

5. The method of claim 4, further comprising:
   generating, by the computing system, an advertisement on a display during the base mode of game operation but not generating an advertisement during the enhanced mode of game operation.

6. A method of providing a non-gambling video slot game comprising:
   receiving, at a computing system, registration data;
   confirming, by the computing system, the registration data and determining whether the registration data corresponds to a base tier or a premium tier;
   receiving, at the computing system, a start input;
   in response to receiving the start input, and without any requirement of payment for a wager, the computing system generating a pattern of symbols to perform a video slot game operation resulting in a game outcome;
   determining, by the computing system, the game outcome and responsively making a payout determination, wherein:
      upon determining the registration data corresponds to the base tier, the computing system performs the payout determination in accordance with a base pay table, the base pay table correlating a plurality of game outcomes with a raffle ticket payout, or
      upon determining the registration data corresponds to the premium tier, the computing system performs the payout determination in accordance with a premium pay table, the premium pay table correlating at least one game outcome with a raffle ticket payout and at least one game outcome with an unrestricted payout; and
   transmitting, by the computing system, data on any payout to a payout device.

7. The method of claim 6, further comprising:
   periodically conducting a raffle in which a raffle ticket is selected; and
   transmitting, by the computing system, data on the selected raffle ticket to the payout device.

8. The method of claim 7,
   wherein both the base pay table and the premium pay table correlate a plurality of potential game outcomes to a raffle ticket payout, and
   wherein, for at least one potential game outcome, a raffle ticket payout of the premium pay table is larger than a raffle ticket payout of the base pay table.

9. The method of claim 7, wherein:
   the premium tier includes at least first and second premium tier levels,
   the premium pay table includes first and second premium pay tables,
   determining whether the registration data corresponds to the base tier or the premium tier includes determining the registration data corresponds to the premium tier,
   the method further comprises determining the registration data corresponds to the first premium tier level or the second premium tier level,
   the computing system performing the payout determination in accordance with the premium pay table includes performing the payout determination in accordance with the first premium pay table, or the second premium pay table,
   the first and second premium pay tables each correlate a plurality of game outcomes with a raffle ticket payout, and
   for at least one potential game outcome, the second premium pay table correlates a larger raffle ticket payout than the first premium pay table.

10. The method of claim 9, wherein:
the first premium pay table correlates at least one possible game outcome to an unrestricted payout; and
the second premium pay table correlates a larger number of game outcomes to an unrestricted payout than the first premium pay table.

11. The method of claim 7, wherein:
the premium tier includes at least first, second, and third premium tier levels,
the premium pay table includes first, second, and third premium pay tables,
determining whether the registration data corresponds to the base tier or the premium tier includes determining the registration data corresponds to the premium tier,
the method further comprises determining the registration data corresponds to the first premium tier level, the second premium tier level or the third premium tier level,
the computing system performing the payout determination in accordance with the premium pay table includes performing the payout determination in accordance with the first premium pay table, the second premium pay table, or the third premium pay table,
the first, second, and third premium pay tables each correlate a plurality of game outcomes to a raffle ticket payout,
for least one game outcome, the second premium pay table correlates to a larger raffle ticket payout than the first premium pay table, and
for at least one game outcome, the third premium pay table correlates to a larger raffle ticket payout than the second premium pay table.

12. The method of claim 11, wherein:
the first premium pay table correlates at least one possible game outcome to an unrestricted payout,
the second premium pay table correlates a larger number of possible game outcomes to an unrestricted payout than the first premium pay table, and
the third premium pay table correlates a larger number of possible game outcomes to an unrestricted payout than the second premium pay table.

13. The method of claim 7, wherein:
upon determining the registration data corresponds to a base tier, the computing system performs the video slot game operation at a first rate of play, or
upon determining the registration data corresponds to a premium tier, the computing system performs the video slot game operation at a second, faster rate of play.

14. The method of claim 7, wherein:
upon determining the registration data corresponds to the base tier, the computing system provides a graphical display and sound at a first quality level during the video slot game operation, or
upon determining the registration data corresponds to the premium tier, the computing system provides a graphical display and sound at a second, higher quality level.

15. The method of claim 14, wherein the graphical display and sound at the second, higher quality level includes providing a video conference at the computing system during the video slot game operation.

16. The method of claim 14, wherein:
the graphical display and sound at the first quality level is provided via an audio or video file having a first file name extension, and
the graphical display and sound at the second, higher quality level is provided via an audio or video file having a second file name extension different than the first file name extension.

17. The method of claim 7, wherein:
the premium tier includes at least first and second premium tier levels,
determining whether the registration data corresponds to the base tier or the premium tier includes determining the registration data corresponds to the premium tier,
the method further comprises determining the registration data corresponds to the first premium tier level or the second premium tier level,
upon determining the registration data corresponds to the first premium tier level or the second premium tier level, the computing system makes the payout determination in accordance with a first premium pay table, or a second premium pay table, respectively, both the base pay table and the first premium pay table correlate a plurality of potential game outcomes to a raffle ticket payout,
the first premium pay table correlates a plurality of game outcomes to a larger raffle ticket payout than the base pay table, and
the second premium pay table correlates a plurality of potential game outcomes to a drawing ticket payout, the drawing ticket payout being different than the raffle ticket payout, and the method further comprises:
periodically conducting a drawing, separate from the raffle, in which a drawing ticket is selected; and
transmitting, by the computing system, data on the drawing ticket selected to the payout device.

18. The method of claim 7, wherein:
the premium tier includes at least first and second premium tier levels,
the premium pay table includes first and second premium pay tables,
determining whether the registration data corresponds to the base tier or the premium tier includes determining the registration data corresponds to the premium tier,
the method further comprises determining the registration data corresponds to the first premium tier level or the second premium tier level,
the computing system performing the payout determination in accordance with the premium pay table includes performing the payout determination in accordance with the first premium pay table, or the second premium pay table,
the second premium pay table correlates a plurality of game outcomes to tokens, and
a predetermined number of tokens accumulated over one or more gaming operations correlate to an unrestricted payout.

19. The method of claim 7, wherein the premium pay table correlates at least one game outcome to a pass for playing a different, arcade game at no cost.

20. The method of claim 7, wherein the premium pay table correlates at least one potential game outcome to a pass for playing a different, video slot game at no cost.

21. A computing system comprising:
at least one processor; and
a non-transitory, computer-readable memory having stored thereon program instructions that, when executed by the at least one processor, cause the computing system to perform operations comprising:
receiving, by the at least one processor, registration data;

confirming, by the at least one processor, the registration data and determining whether the registration data corresponds to a base tier or a premium tier;

receiving, at the at least one processor, a start input;

in response to receiving the start input, and without any requirement of payment for a wager, the at least one processor performing a game operation resulting in a game outcome;

determining, by the at least one processor, the game outcome and responsively making a payout determination, wherein the at least one processor performs a base mode of game operation upon determining the registration data corresponds to the base tier or an enhanced mode of game operation upon determining the registration data corresponds to the premium tier; and transmitting, by the at least one processor, data on any payout to a payout device.

\* \* \* \* \*